(12) United States Patent
Ohsawa

(10) Patent No.: US 6,415,052 B1
(45) Date of Patent: Jul. 2, 2002

(54) COLOR IMAGE PROCESSING APPARATUS

(75) Inventor: Hidefumi Ohsawa, Urawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/394,212

(22) Filed: Feb. 24, 1995

Related U.S. Application Data

(63) Continuation of application No. 08/155,531, filed on Nov. 22, 1993, now abandoned, which is a continuation of application No. 07/911,367, filed on Jul. 13, 1992, now abandoned, which is a continuation of application No. 07/173,654, filed on Mar. 25, 1988, now abandoned.

(30) Foreign Application Priority Data

Mar. 27, 1987 (JP) .............................................. 62-73783
Dec. 28, 1987 (JP) ............................................ 62-336356

(51) Int. Cl.[7] ................................................. G06K 9/46
(52) U.S. Cl. ....................... 382/191; 382/192; 382/270; 382/271
(58) Field of Search ................................. 382/191, 192, 382/270, 271, 273, 429, 455, 457, 458, 461, 464

(56) References Cited

U.S. PATENT DOCUMENTS 4,251,837 A * 2/1981 Janeway, III ................ 358/455
4,486,785 A * 12/1984 Lasher et al. ................ 358/455
4,554,593 A * 11/1985 Fox et al. .................... 358/455
4,742,400 A * 5/1988 Tsuji ........................... 358/457
5,018,024 A 5/1991 Tanioka ....................... 358/457

FOREIGN PATENT DOCUMENTS

JP 5648869 11/1981 ............. G30F/5/00
JP 6113262 1/1986 .......... G03G/15/01

* cited by examiner

Primary Examiner—Jose L. Couso
Assistant Examiner—Anh Hong Do
(74) Attorney, Agent, or Firm—Fitzpatrick, Cella, Harper & Scinto

(57) ABSTRACT

A color image processing apparatus for digitally reading a color document and effecting digital printing comprises a character region extracting device for extracting a character region of the color document; a black portion extracting device for extracting a black portion of the color document; and a single black color processing device for processing a single black color only with respect to a region which falls within the character region and the black portion in the color document, so as to allow character portions to be distinguished favorably.

65 Claims, 18 Drawing Sheets

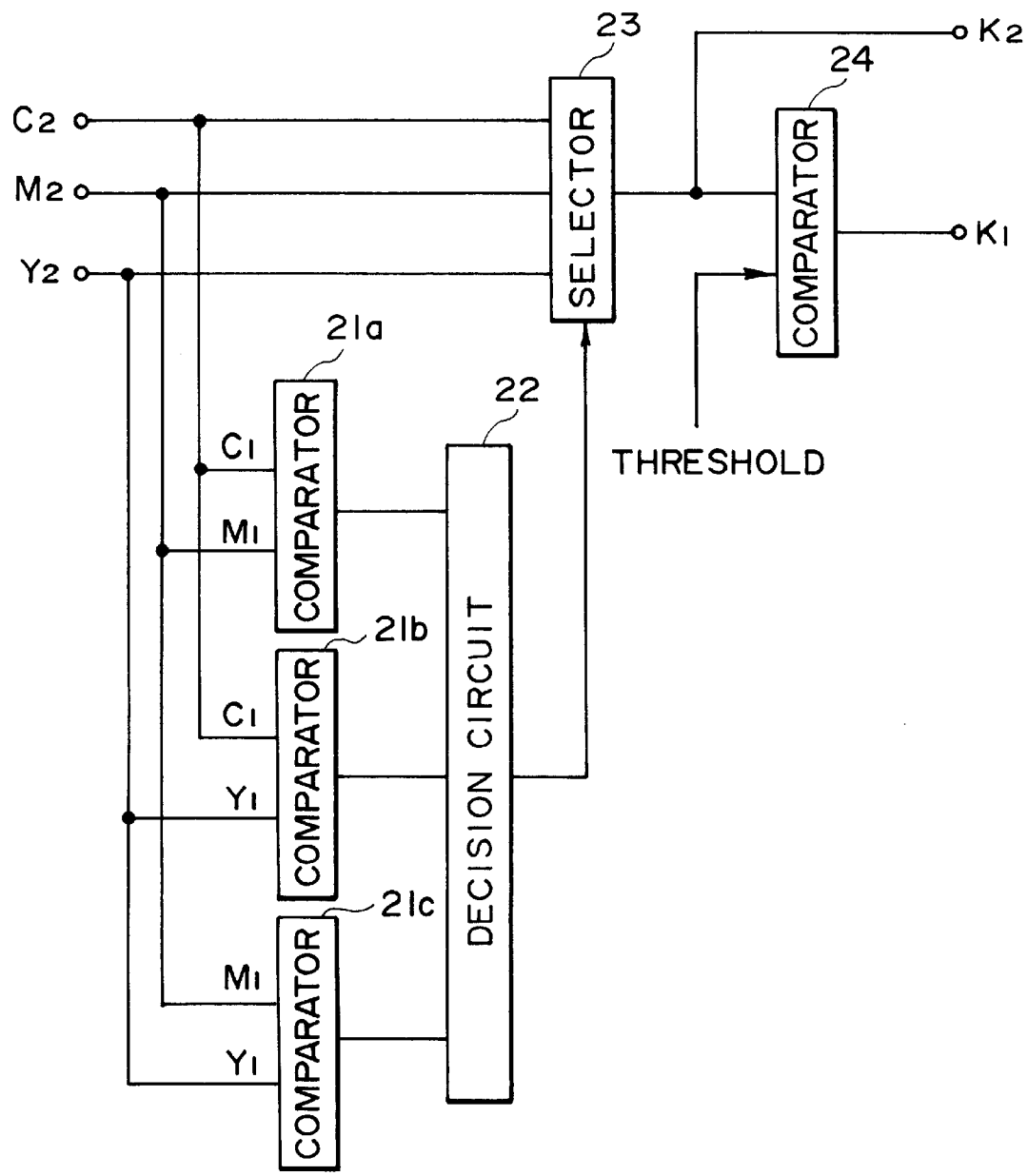
F I G. 2

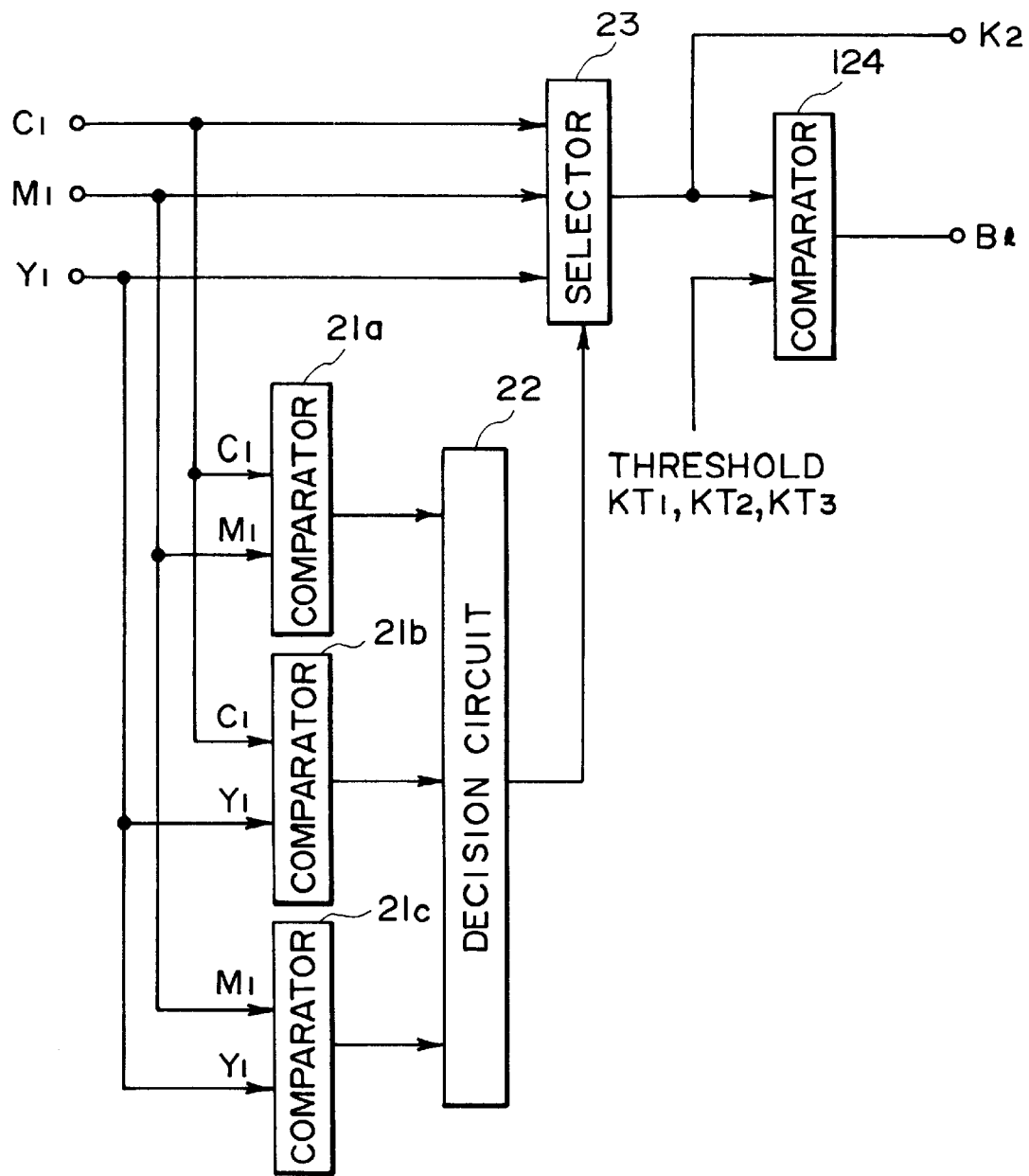
F I G. 9

(1)

(2)

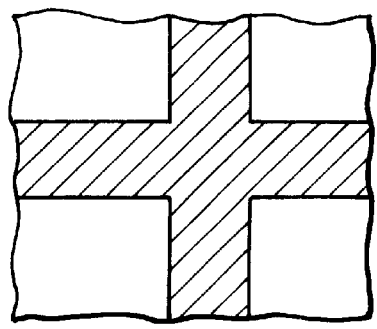
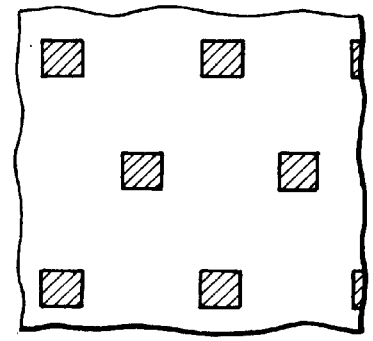
F I G. 13A    F I G. 13B
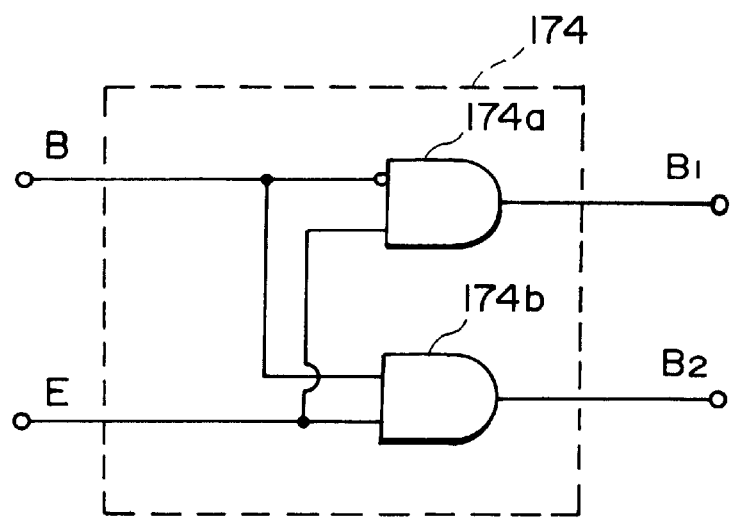
F I G. 16

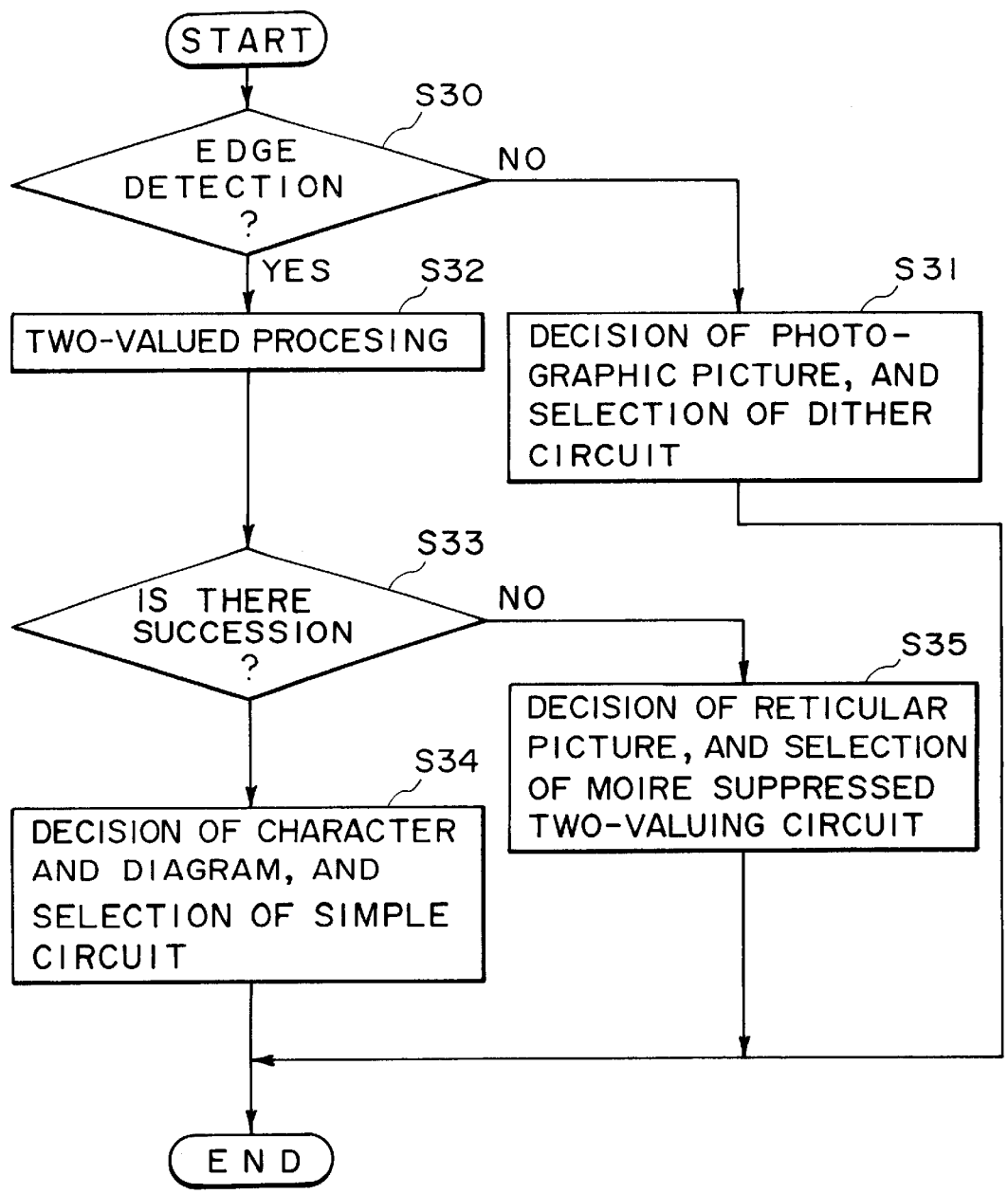
F I G. 14

COLOR IMAGE PROCESSING APPARATUS

This application is a continuation of application Ser. No. 08/155,531 filed Nov. 22, 1993, now abandoned, which is a continuation application of Ser. No. 07/911,367, filed Jul. 13, 1992, abandoned, and which is a continuation application of Ser. No. 07/173,654, filed Mar. 25, 1988, abandoned.

BACKGROUND OF THE INVENTION

1. Field of the Invention

The present invention relates to a color image processing apparatus.

2. Related Background Art

In the conventional color digital image processing that is undertaken in digital color copying machines, digital color facsimile equipment and the like, full color images are obtained by using four colored inks of yellow, magenta, cyan and black in accordance with a subtractive color mixing process.

With respect to the black-color portions of a document, it is necessary to selectively use the black that is formed by superposing the three colors of yellow, magenta and cyan and the black that is formed by using the black ink alone.

In the undercolor removal (UCR) process which is conventionally employed in printing and the like, the minimum values of yellow, magenta and cyan are calculated as the black color, and the amount of each colored ink is reduced in a specific ratio with that reduced portion being replaced by the black ink.

This process makes it possible to reproduce a black whose density is greater than the black formed by superposing yellow, magenta and cyan, and the amounts of yellow, magenta and cyan inks used can thus be reduced.

However, if all the black portions are replaced by the black ink (100% UCR) as in the case of the above-described conventional apparatus, the quality of the image becomes degraded, so that it is impossible to realize 100% UCR.

Accordingly, an arrangement is made in which a small amount of each of the yellow, magenta and cyan is left. However, there is still a problem in that the remaining inks are scattered in the black character portions, and this scattering of the colored inks is noticeable, deteriorating the quality of the black characters.

A method of overcoming such problems is disclosed in U.S. Pat. No. 4,700,399 assigned to the assignee of this application. This application discloses a structure in which the proportion of undercolor removal carried out at the edge of a color image is increased and the quantity of the black ink is increased here to emphasize the edge.

SUMMARY OF THE INVENTION

Accordingly, a primary object of the present invention is to provide an image processing apparatus which is capable of performing efficient discrimination of character portions, thereby overcoming the above-described drawbacks of the prior art.

Another object of the present invention is to provide an image processing apparatus which is capable of preventing any downgrading of the quality of characters in a color image.

Still another object of the present invention is to provide an image processing apparatus which is capable of preventing the bleeding of characters in a color image to the peripheral portions thereof.

To these ends, according to one aspect of the present invention, there is provided a color image processing apparatus for digitally reading a color document and effecting digital printing, the color image processing apparatus comprising: character region extracting means for extracting a character region of said color document; black portion extracting means for extracting a black portion of said color document; and single black color processing means for processing a single black color only with respect to a region which falls within the character region and the black portion in the color document.

A further object of the present invention is to provide an image processing apparatus which is capable of detecting the continuation of a line in a character portion to favorably distinguish the character portion.

To this end, according to another aspect of the invention, there is provided an image processing apparatus comprising: input means for inputting image data; means for detecting an amount of change in the density of a block of m×n picture elements; two-valuing means for two-valuing the picture elements within the picture element block; and succession detecting means for detecting the succession of the two-valued picture elements within the picture element block.

These and other objects, features and advantages of the present invention will become apparent from the following detailed description of the invention when read in conjunction with the accompanying drawings.

BRIEF DESCRIPTION OF THE DRAWINGS

FIG. 2 is a block diagram illustrating one example of a black detection circuit in the first embodiment;

FIG. 9 is a block diagram illustrating the configuration of a black detection circuit 117 shown in FIG. 8;

FIGS. 13A and 13B are diagrams illustrating a difference between a diagram and a reticular image.

FIG. 14 is a flowchart on discrimination of an image;

FIG. 16 is a diagram illustrating a specific arrangement of a correcter shown in FIG. 15;

DESCRIPTION OF THE PREFERRED EMBODIMENTS

Figure 1:
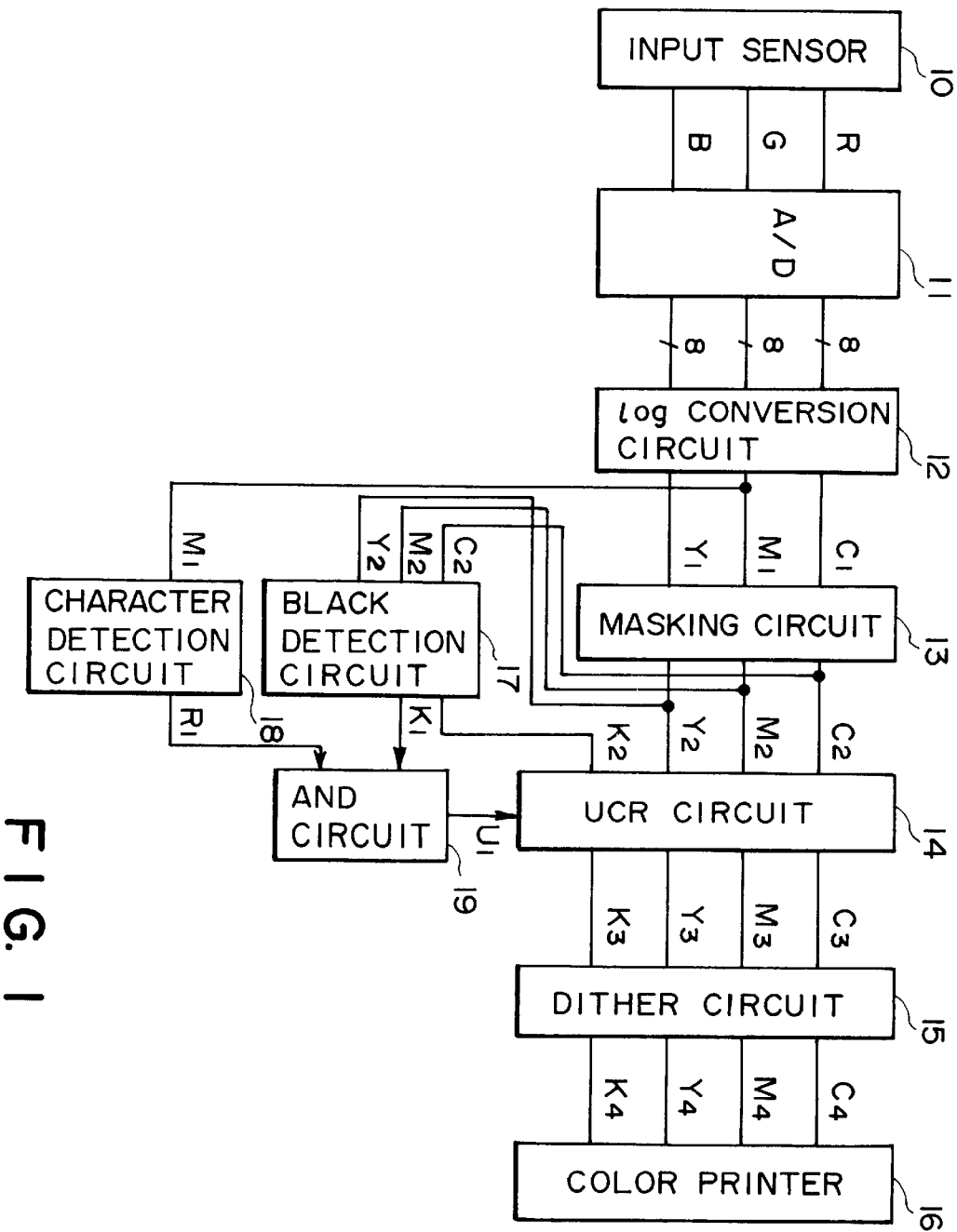
FIG. 1 is a block diagram illustrating a first embodiment of the present invention.

FIG. 1 is a block diagram illustrating a first embodiment of the present invention.

An input sensor 10 has a photoelectric conversion element, such as a CCD camera or the like, and is adapted to read a document and output three-color separation signals of red (R), green (G) and blue (B). An A/D converter 11 converts each of the aforementioned signals into 8-bit digital signals, thereby making it possible to express gradations in 256 stages for each color. A log converter 12 converts into density the digital signals of each color expressed in gradations of 256 stages and outputs signals $C_1$, $M_1$ and $Y_1$ which express the amounts of the three colored inks of cyan, magenta and yellow.

A masking circuit 13 effects color correction processing of the signals $C_1$, $M_1$, and $Y_1$, and this color correction is carried out to eliminate a turbid component of the color-separation filter and a turbid component of the inks. In addition, the aforementioned masking is effected in accordance with the following formulae:

$$Y_2 = k_{11}Y_1 + k_{12}M_1 + k_{13}C_1$$

$$M_2 = k_{21}Y_1 + k_{22}M_1 + k_{23}C_1$$

$$C_2 = k_{31}Y_1 + k_{32}M_1 + k_{33}C_1$$

where $k_{11}$ to $k_{33}$ are parameters that are determined experimentally.

A UCR circuit 14 performs undercolor removal processing and calculation of the black ink with respect to the signals $C_2$, $M_2$, and $Y_2$ output from the masking circuit 13. This processing is effected in accordance with the following formulae:

$$Y_3 = Y_2 - \alpha(K_2 - \beta)$$

$$M_3 = M_2 - \alpha(K_2 - \beta)$$

$$C_3 = C_2 - \alpha(K_2 - \beta)$$

where $K_2 = \min(_2, M_2 \text{ and } C_2)$; $K_2$ an output of a black detection circuit; and $\alpha$ and $\beta$ are constants. When $\alpha = 1$, and $\beta = 0$, the state is called 100% UCR, in which case all the black formed by the three colors of yellow, magenta and cyan is replaced by the black ink.

A dither circuit 15 effects two-valuing of the signals $C_3$, $M_3$, $Y_3$ and $K_3$ output from the UCR 14, and signals $C_4$, $M_4$, $Y_4$ and $K_4$ are sent to a color printer 16 one bit at a time, respectively. In other words, a color image is formed by the on/off operation of the ink dots.

A black detection circuit 17 detects a minimum value among the signals $C_2$, $M_2$ and $Y_2$ output from the masking circuit 13 and outputs the same as the black signal $K_2$. In addition, the black detection circuit 17 is arranged such that the output $K_1$ thereof is set to "1" when the amount of the black color is above a specific threshold.

In addition, a character detection circuit 18 detects the continuation of an image on the basis of the output $M_1$ of the log conversion circuit 12. In other words, when there is succession in $M_1$, the output $R_1$ is set to "1". An AND circuit 19 performs an AND operation of the outputs $K_2$ and $R_1$. Accordingly, when the color is detected to be black and its succession is detected, the output U1 is set to "1", and the amount of UCR is changed over by inputting this signal to the UCR circuit 14.

FIG. 2 is a block diagram illustrating an example of the black detection circuit 17.

Comparators 21a, 21b and 21c compare two of the color signals $C_2$, $M_2$ and $Y_2$, respectively, and the results of comparison are sent to a decision circuit 22. The decision circuit 22 selects the minimum value of the three signals, and sends the result to a selector 23, which in turn outputs the minimum value of the signals $C_2$, $M_2$ and $Y_2$. The signal of this minimum value is set as $K_2$. A comparator 24 compares the minimum value signal $K_2$ with the threshold of $M_2$, and when the minimum value signal $K_2$ is above that threshold, the comparator 24 sets the output $K_1$ to "1".

Figure 3:
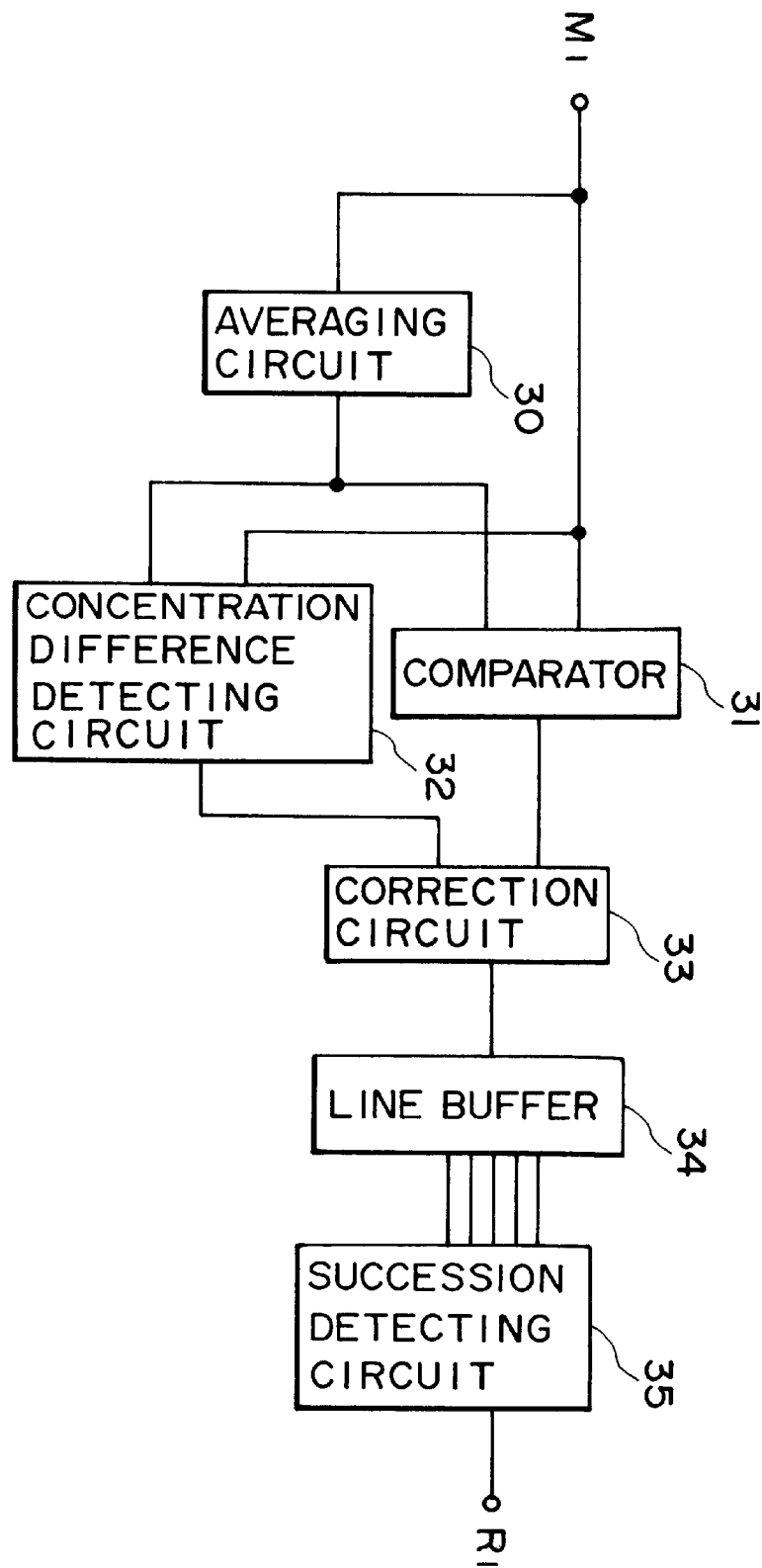
FIG. 3 is a block diagram illustrating a first example of a character detection circuit in the first embodiment.

FIG. 3 is a block diagram illustrating an example of the character detection circuit 18.

An averaging circuit 30 operates an average value within a particular region, while a comparator 31 compares this average value with the original input signal $M_1$ and performs a two-valuing operation in such a manner as to output "1" when $M_1$ is greater and "0" when it is smaller.

A density detection circuit 32 determines the magnitude of the absolute value of a difference between the output $M_1$ and the average value, and outputs "1" when the absolute value is greater than a specific threshold and "0" when it is smaller. A correction circuit 33 is a gate circuit which allows the output of the comparator 31 to be passed only when the output of the density detection circuit 32 is "1" and constantly holds said output at "0" when the output of the density detection circuit 32 is "0". As a result, the two-valuing operation is effected selectively only when the difference in density is large. This data is stored in a line buffer 34.

Figure 5:
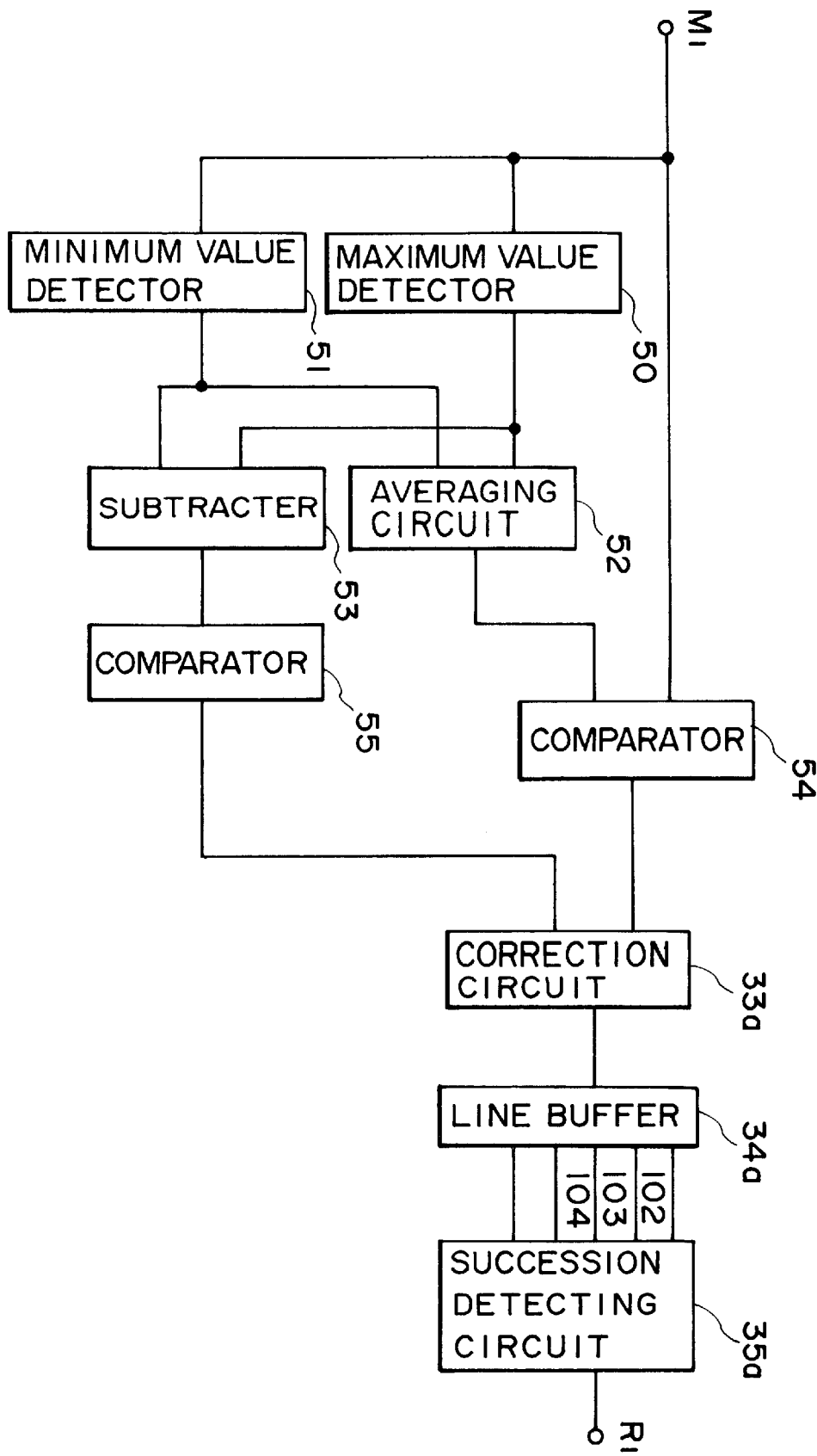
FIG. 5 is a block diagram illustrating a second example of the character detection circuit in the first embodiment.

FIG. 5 is a block diagram illustrating a second example of the character detection circuit in the above-described embodiment.

In this example, a succession detecting circuit 35a detects succession of picture elements calculated greater than the specific threshold and therefore represented by "1" of the two values in the vertical, horizontal and diagonal directions, i.e., four directions. An example of this succession detecting circuit 35a is illustrated in FIG. 4.

Figure 4:
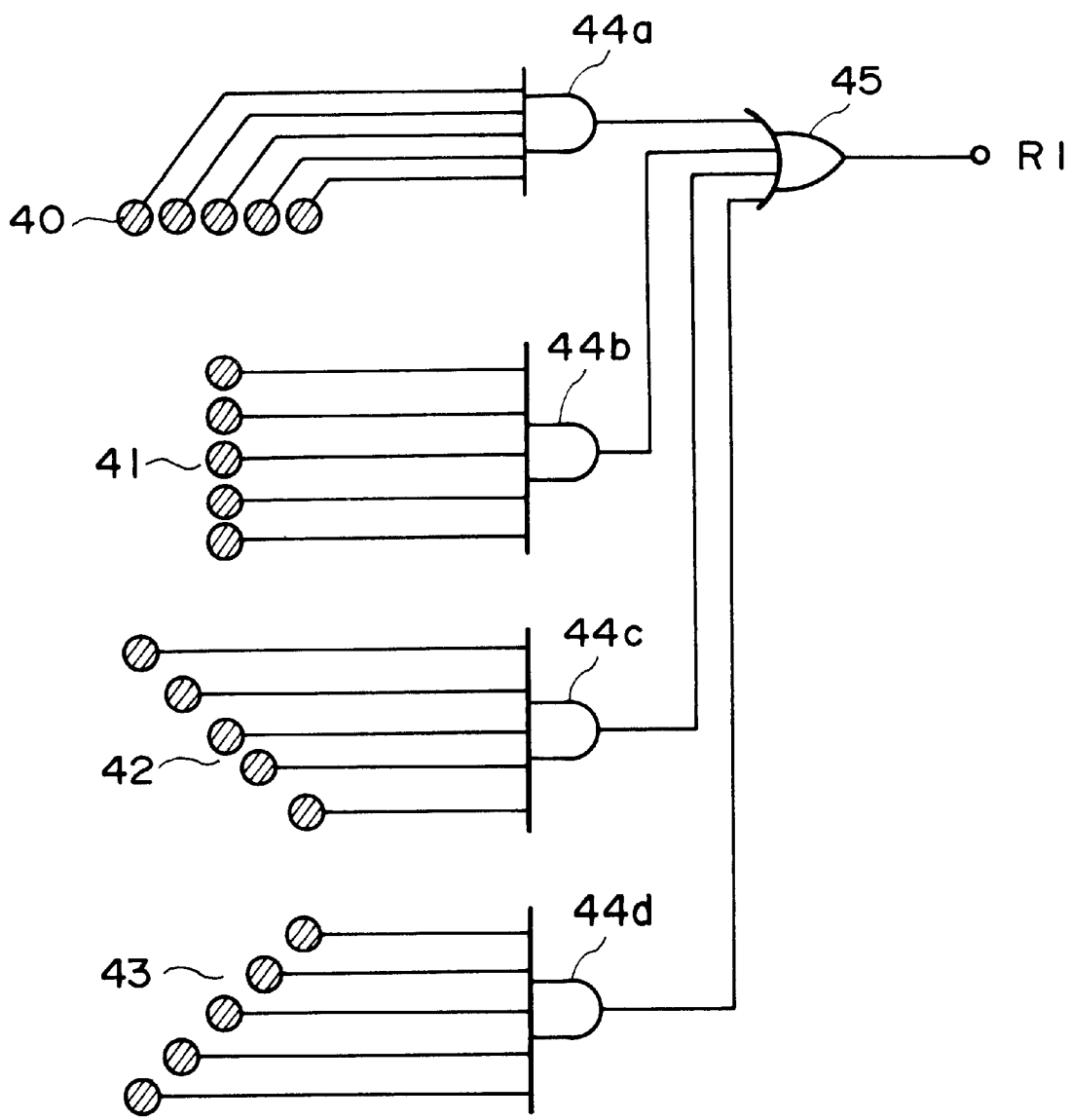
FIG. 4 is a diagram illustrating an example of a succession detecting circuit in the first embodiment.

In FIG. 4, picture element arrays 40, 41, 42, and 43 indicate the positions of the picture elements in the horizontal, vertical, and two diagonal directions, respectively. The binary data of each picture element undergo logical operations by AND circuits 44a, 44b, 44c 44d, and each AND circuit outputs "1" when all of the five picture elements input are "1". These outputs are subjected to a logical operation by an OR circuit 45. Accordingly, when picture elements of "1" continue in any one of the vertical, horizontal and diagonal directions, the OR circuit 45 outputs "1". This output "1" is a signal which indicates succession, and this signal is sent to the UCR circuit 14 as the signal $R_1$.

In FIG. 5, a maximum value detector 50 and a minimum value detector 51 detect a maximum value and a minimum value, respectively, within a specific region (e.g., 3×3 picture elements). An averaging circuit 52 averages the maximum and minimum values thus obtained, and the average value is obtained by dividing by two a value in which the maximum and minimum values are added. A comparator 54 compares the aforementioned average value and the signal $M_1$ to output a binary signal. The comparator 54 outputs "1" when the signal $M_1$ is greater and "0" when it is smaller.

A subtracter 53 performs the operation of subtracting the minimum value from the maximum value, and output thereof is compared with a specific threshold in a comparator 55, which outputs "1" when the output of the subtracter 53 is greater and "0" when it is smaller. A correction circuit 33a receives the outputs of the comparators 54, 55 and is similar to the correction circuit 33 shown in FIG. 3. In addition, a line buffer 34a is similar to the line buffer 34 shown in FIG. 3.

Figure 6:
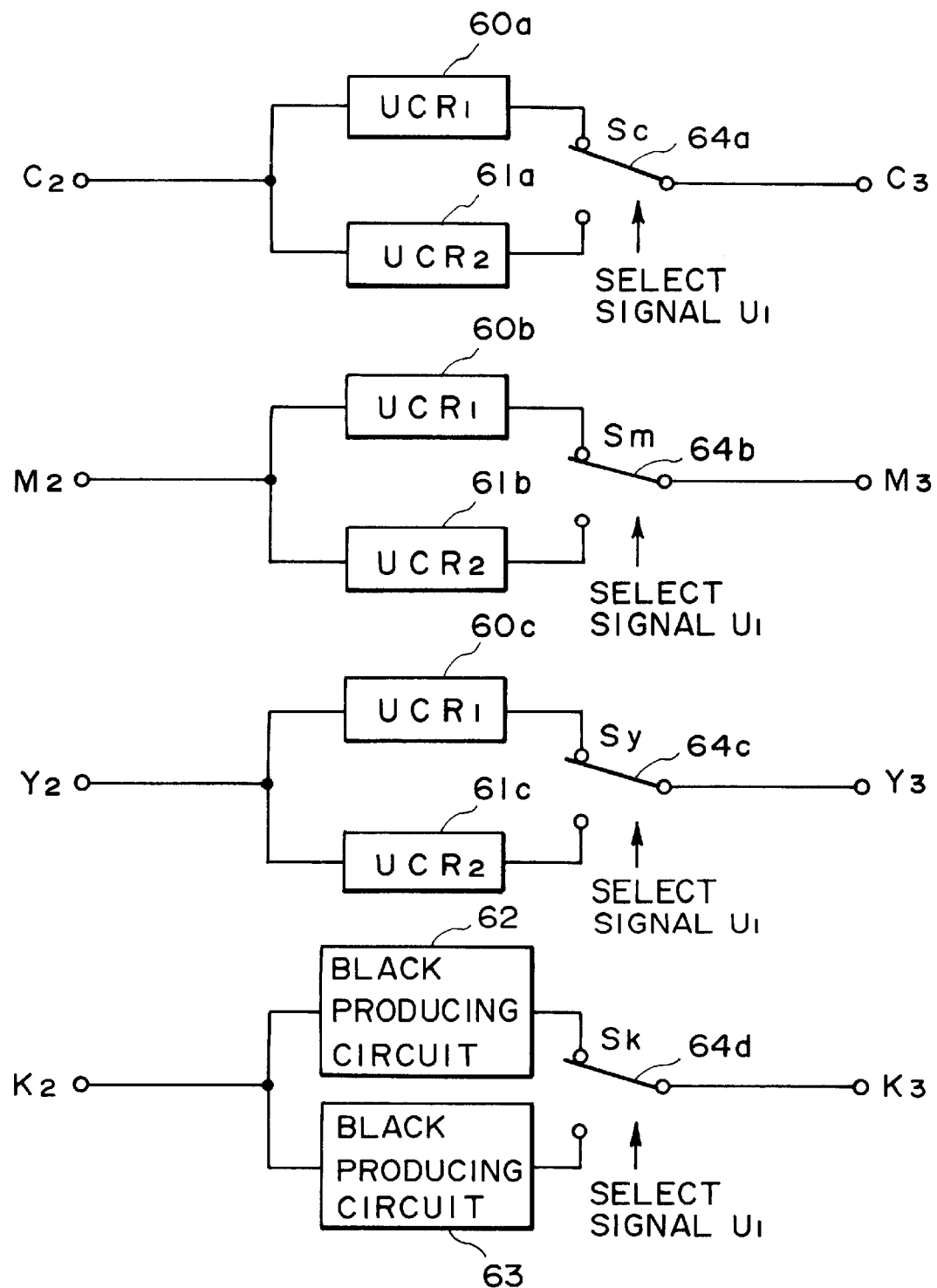
FIG. 6 is a diagram illustrating how selection is carried out in a UCR circuit in the first embodiment.

FIG. 6 is a block diagram illustrating selection by the UCR circuit 14 in the above-described embodiment.

UCR circuits 60a, 60b, 60c effect UCR processing of a half-tone portion, while UCR circuits 61a, 61b and 61c perform UCR processing of the character portion.

Figure 7:
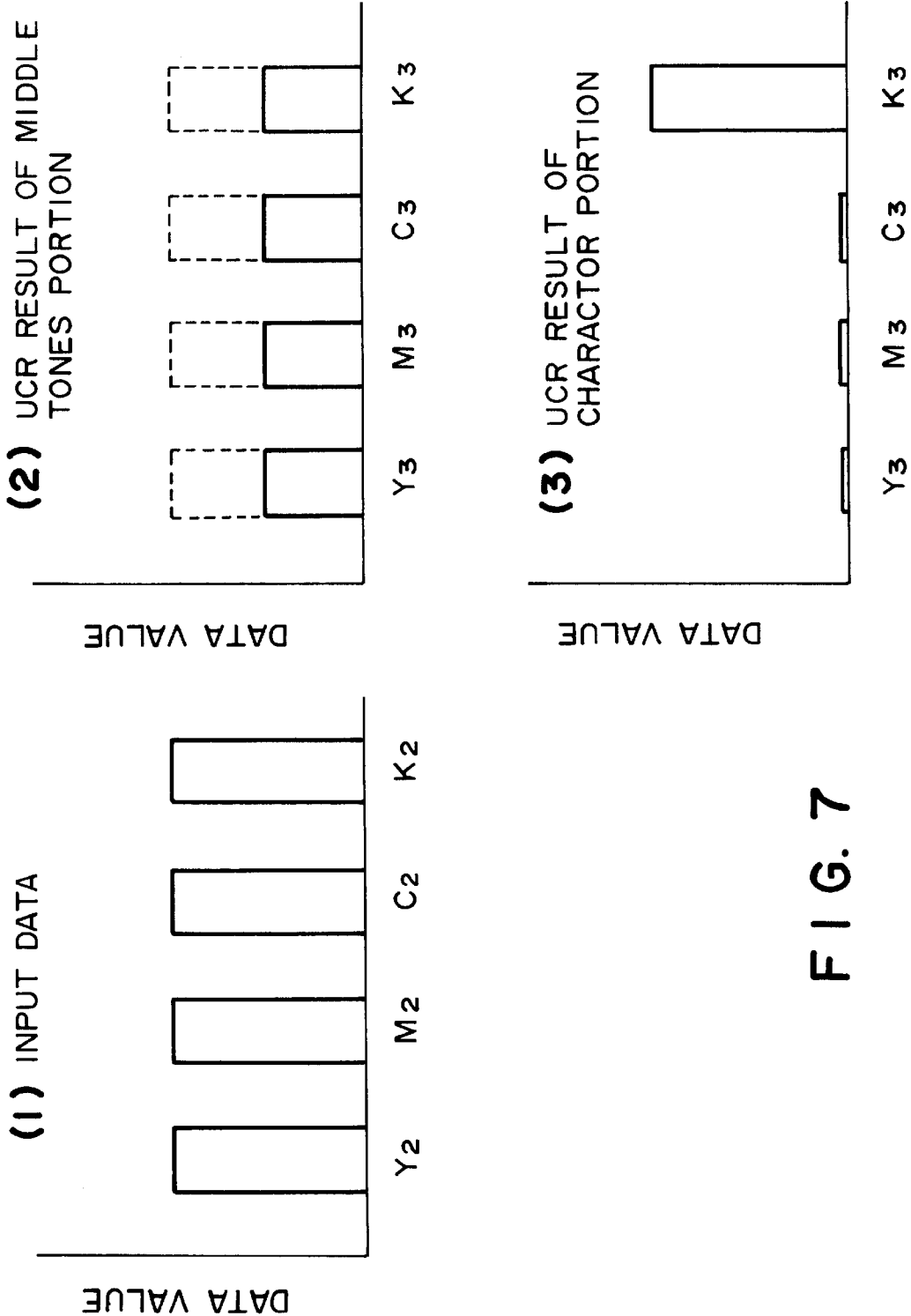
FIG. 7 is a diagram illustrating UCR processing in a half-tone portion and a character portion in the first embodiment.

FIG. 7 is diagram explaining the UCR processing of a half-tone portion and the UCR processing of a character portion.

FIG. 7(1) illustrates a state in which the color signal data $Y_2$, $M_2$, $C_2$, $K_2$ are input at the same level. FIG. 7(2) is a diagram which shows the result of UCR processing of the half-tone portion, in which the amounts of the color signal data $Y_2$, $M_2$, $C_2$ are reduced to approximately half and are set as $Y_3$, $M_3$, $C_3$, and, instead, the black data $K_3$ is produced in a black producing circuit 62. This is referred to as 50% UCR.

Meanwhile, in a character portion, as shown in FIG. 7(3), the amounts of the color signal data $Y_3$, $M_3$, $C_3$ are set to substantially zero, and, instead, the black data $K_3$ is produced in the black producing circuit 63 so as to replace the colored inks. This is referred to as 100% UCR.

By changing over select circuits 64a, 64b, 64c, 64d in accordance with the select signal U1, the afore-mentioned data are selected to output the amounts of ink $C_3$, $M_3$, $Y_3$, $K_3$ that are suited to the half-tone portion and the character portion.

In the above-described embodiment, 100% UCR is performed with respect to portions that are detected to be character portions, but a description will now be given of a second embodiment which is capable of reproducing the character portion more satisfactorily by varying the percent of UCR in correspondence with the levels of the black signals in a region which is detected to be such a character portion.

Figure 8:
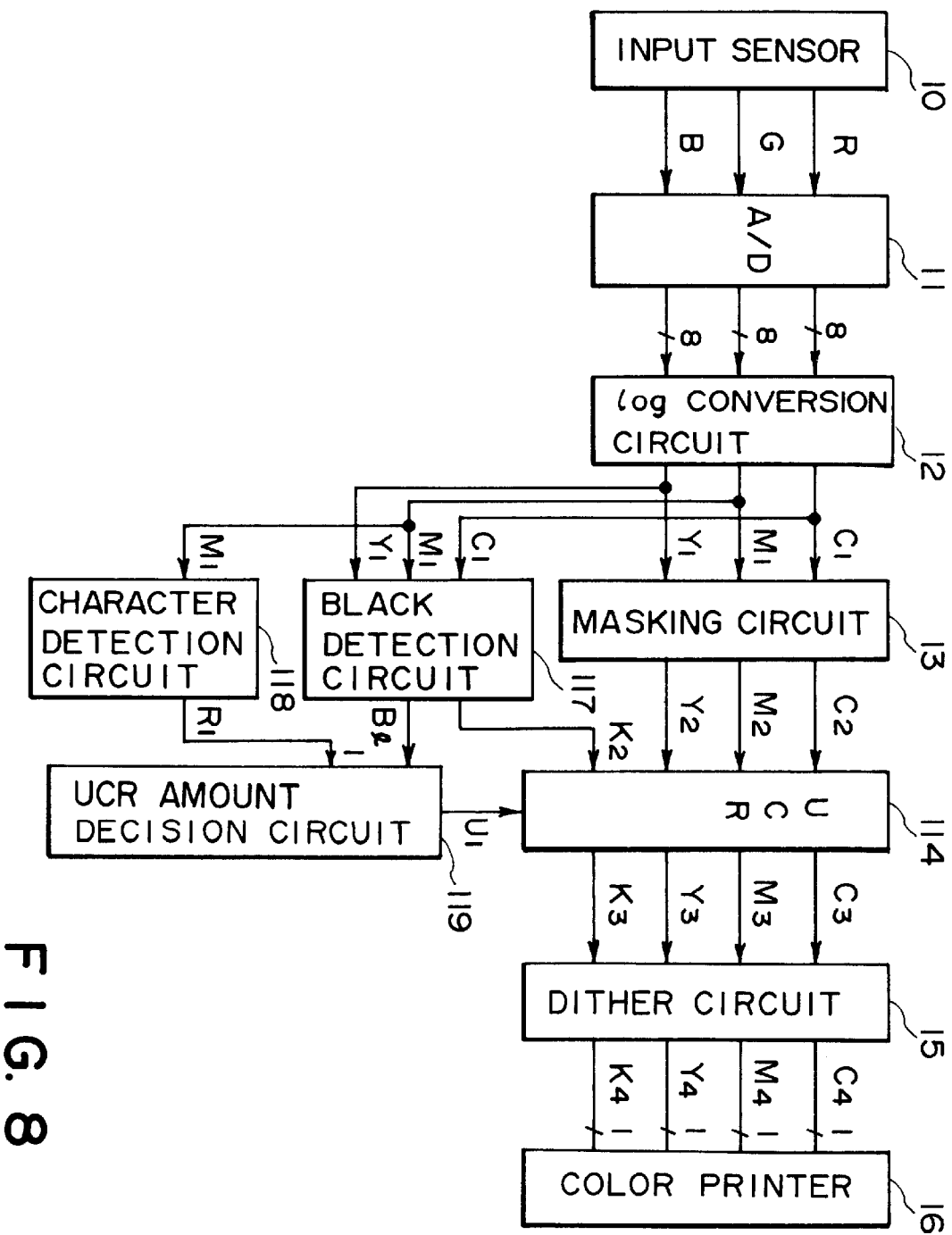
FIG. 8 is a block diagram illustrating a second embodiment.

FIG. 8 is a block diagram illustrating the configuration of such an embodiment, and those elements that have functions similar to those shown in FIG. 1 are denoted by the same reference numerals, and a description thereof will be omitted.

In FIG. 8, a black detection circuit 117 detects a minimum value of signals C1, M1, Y1 on the basis of the signals C1, M1, Y1, and the output of this black detection circuit is set as the black signal K2. A black level Bl is determined in correspondence with the value of this black signal K2. The black level Bl is set to, for instance, four stages, as shown in Table 1 below.

TABLE 1

| K2 | Bl |
|---|---|
| $0 \leq K2 < KT1$ | 0 |
| $KT1 \leq K2 < KT2$ | 1 |
| $KT2 \leq K2 < KT3$ | 2 |
| $KT3 \leq K2 < 255$ | 3 |

Incidentally, KT1, KT2 and KT3 are constants that are respectively determined experimentally.

A UCR amount decision circuit 119 decides a UCR amount on the basis of the output R1 and the black level Bl.

The relationships among the output R1 of the character detecting circuit 18, the black level Bl, the output signal U1 of the UCR amount decision circuit 119, and the UCR amount are shown in Table 2 below.

TABLE 2

| R1 | Bl | U1 | UCR Amount |
|---|---|---|---|
| 1 | 0 | 0 | 0% UCR |
| 1 | 1 | 1 | 25% UCR |
| 1 | 2 | 2 | 50% UCR |
| 1 | 3 | 3 | 100% UCR |
| 0 | ... | 0 | ... |

A UCR circuit 114 changes over the UCR amount in correspondence with the output signal U1 of the UCR amount decision circuit 119.

FIG. 9 is a block diagram illustrating a specific example of a black detection circuit 117.

In FIG. 9, those elements having functions that are similar to those shown in FIG. 2 are denoted by the same reference numerals, and a description thereof will be omitted.

In FIG. 9, the function of a comparator 124 differs. Namely, the comparator 124 compares the black signal K2 and a plurality of specific thresholds $KT_1$, $KT_2$, $KT_3$, and outputs various black levels Bl, as shown in Table 1.

A description will now be given of the configuration of the UCR circuit 114 shown in FIG. 8.

Figure 10:
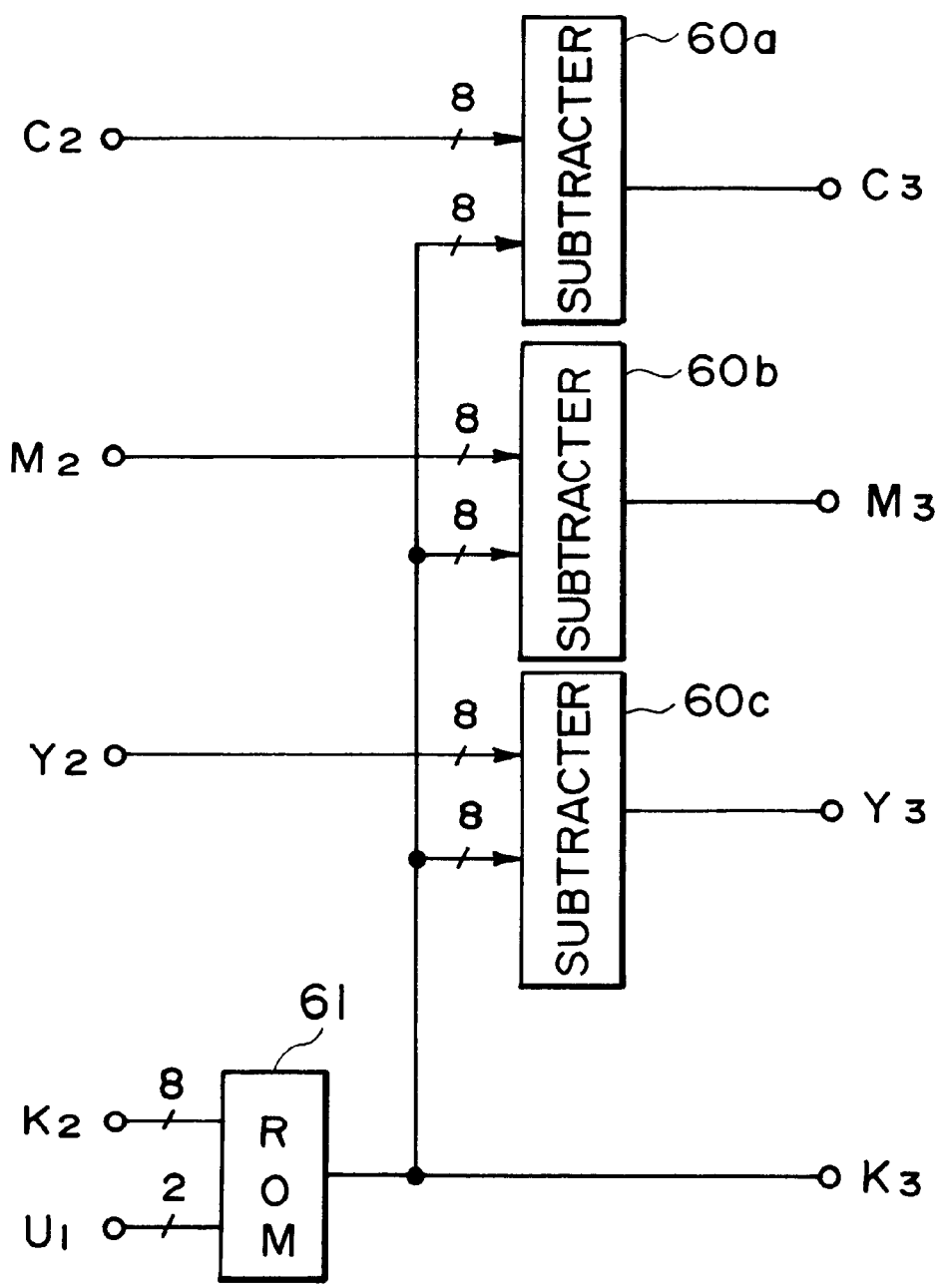
FIG. 10 is a block diagram illustrating the configuration of a UCR circuit 114 shown in FIG. 8.

FIG. 10 is a block diagram illustrating a specific example of the UCR circuit 114 in accordance with the second embodiment.

Figure 11:
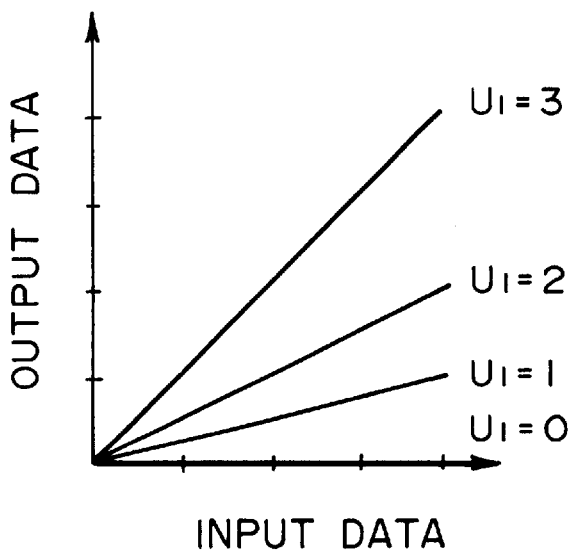
FIG. 11 are graphs illustrating the characteristics of a ROM 61 shown in FIG. 10.
Figure 11:
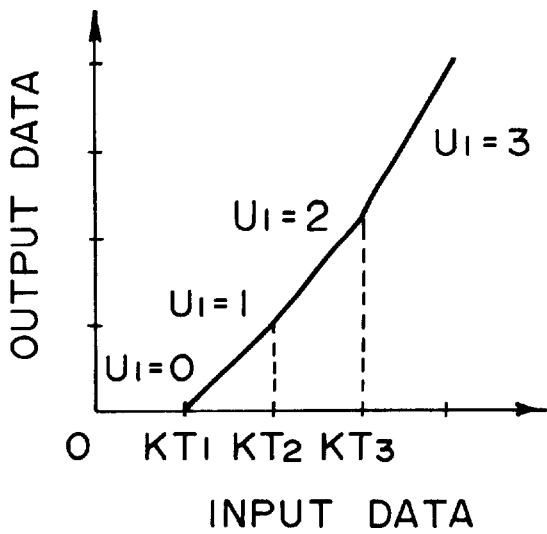

A table ROM 61 determines output data with respect to input data in accordance with the value of U1 output by the UCR amount decision circuit 119, and when U1 is 0, 1, 2, and 3, the gradients in FIG. 11(1) are 0.1, ¼, ½, and 1. The signal K3 output by this table ROM 61 is the black data showing the amount of black, and the subtracters 60a to 60c subtract the black data K3 from C2, M2, Y2, respectively, to output the signals C3, M3, Y3.

In addition, the quality of the image can be improved further if the amount of black and the UCR amount are varied smoothly, as shown in FIG. 11(2).

In accordance with this embodiment, by changing over the UCR amount in correspondence with the selected signal U1, it is possible to determine the optimum ink amounts C3, M3, Y3, K3 for the half-tone portion and the character portion.

In the above-described embodiment, although magenta signal (M1) is used in detecting the character, a green signal or a signal representing another level of brightness may be used instead.

In addition, in accordance with this embodiment, when a character region is to be extracted, since the character region is extracted by taking note of the continuity of the line forming the character, it is possible to accurately extract the character portion unlike in the case where the edge is merely discriminated to detect the character region. Accordingly, when processing a color image in which each of the Y, M, C colors is formed by half-tone dots, it is possible to overcome the drawback that if the half-tone dots are superposed, the superposed half-tone dots are erroneously judged to be a character region although they do not actually constitute a character region.

As has been described above, in the above-described embodiments, the character portion is extracted by the character detecting circuit 18 whose details are shown in FIG. 4. A description will now be given of a third embodiment which is capable of further improving the accuracy of this character detection circuit and of effecting processing in accordance with different types of input images.

Figure 12:
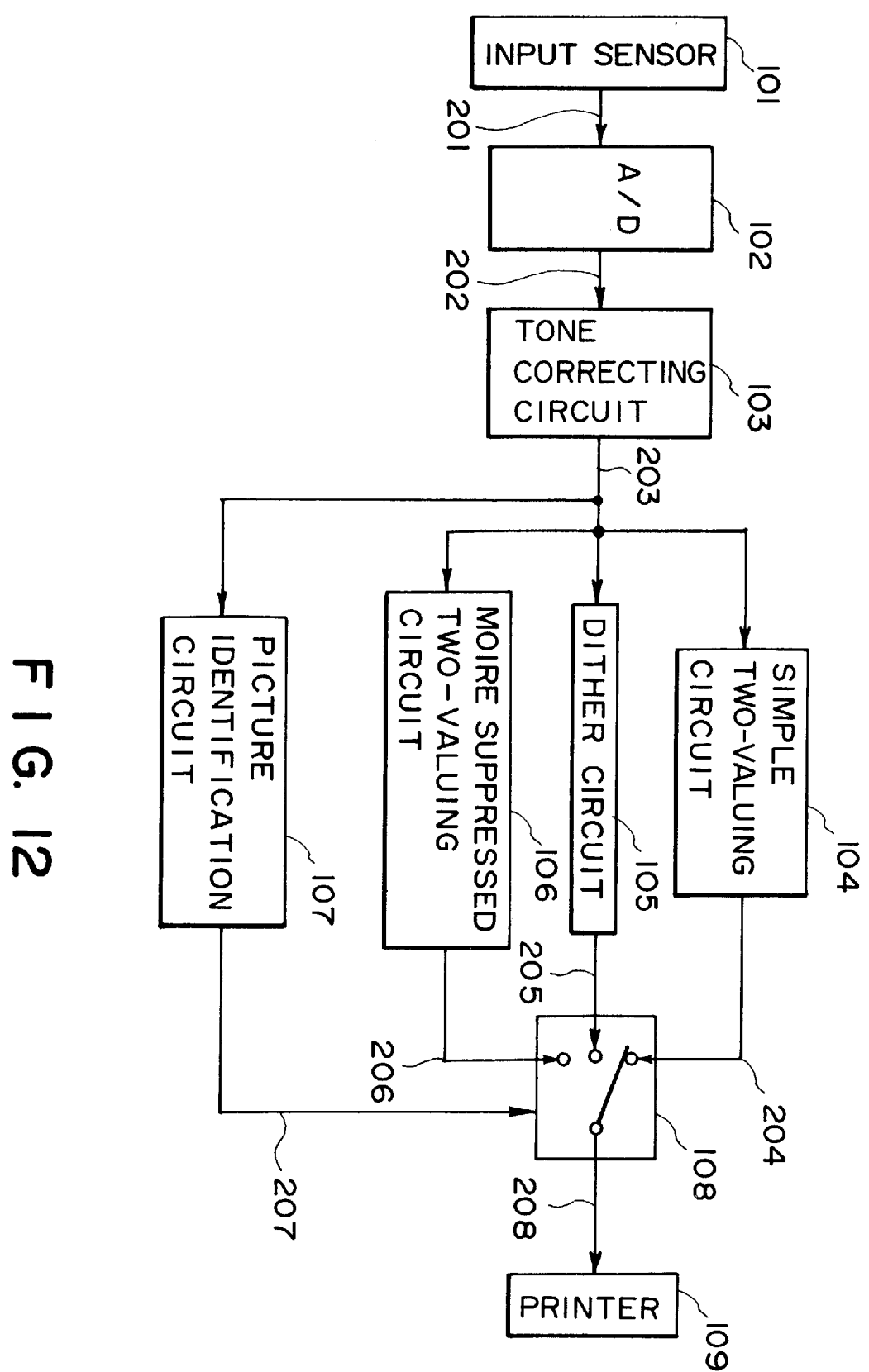
FIG. 12 is a block diagram of a third embodiment of the present invention.

FIG. 12 illustrates an outline of the structure of an image forming apparatus according to another embodiment of the present invention.

Referring to the figure, reference numeral 101 represents an input scanner for optically reading an original, the input scanner being constituted by, for example, CCDs. Reference numeral 102 represents an A/D converter for converting a voltage level signal 201 from the input sensor 101 to digital data 202 of, for example, 8 bits (256 gradients). Reference numeral 103 represents a tone correcting circuit for correcting the converted digital data 202 in accordance with the characteristics of the input sensor 201 or those of a printing mechanism, the tone correcting circuit 103 being constituted by, for example, a look-up table. The digital data 202 which has been corrected is output to a picture identification circuit 107, and also to a simple two-valuing circuit 104, a dither circuit 105, and a moire suppressed two-valuing circuit 106.

In the simple two-valuing circuit 104, by comparing the input digital data 202 with a predetermined threshold (for example, "128", which is half of the maximum gradient), data 204 for controlling on and off ("1" or "0") of an output image is output. The dither circuit 105 outputs the results of comparing a predetermined dither matrix therein (each matrix element is provided with a threshold) with the input digital data 202, the results being output as data 205. The moire suppressed two-valuing circuit 106 is arranged, in this embodiment, to perform the two-valuing treatment by way of preparing a plurality of dither matrices which cannot easily generate beat with the number of line of half-tone dots and selecting the plurality of dither matrices through successive changes. However, a smoothing treatment in which the half-tone dot frequency is cut may be performed. Reference numeral 108 represents a switch for selecting from the circuits 104 to 106, based on the control data from the picture identification circuit 107, one of the outputs from among outputs 204 to 206. The data selected is output to a printer 109.

The picture identification circuit 107 outputs data to a control signal 207 when it is detected that the subject picture element is an edge of a character or a diagram, the data representing a command to select the output from the simple two-valuing circuit 104. The picture identification circuit 107 outputs data representing a command to select the output from the dither circuit 105 to the control signal 207 when it is decided that the subject picture element is a part of a photographic picture. The picture identification circuit 107 outputs data representing a command to select the output from the moire suppressed two-valuing circuit 106 to the control signal 207 when it is decided that the subject picture element is a half-tone dot picture element. Each circuit 104 to 106 is provided with a buffer or the like for the purpose of synchronization with the output signal 207 from the picture identification circuit 107.

<Description of the Principle of Picture Identification (FIG. 13)>

In this embodiment, similar to the above-described embodiment, means for deciding the states of the subject picture element is employed in which the states of the subject picture element are identified from the relationship between the subject picture element and the picture elements surrounding it. Specifically, a central picture element consisting of a 3×3 picture element block is arranged to be the subject picture element, and the state of the subject picture element is decided in accordance with the difference in the averaged concentration between the subject picture element and the eight neighbouring picture elements. If it is decided that the difference in the averaged concentration between the subject picture element and the neighboring picture elements is not significant, it is decided that the subject picture element is a part of a photographic picture.

The problem is to decide whether the subject picture element is a part of a character or a diagram, or whether it is a half-tone dot.

FIGS. 13A and 13B respectively illustrate a part of character (diagram) and a part of a half-tone dot (the hatched area is in black). As shown in the figures, it is decided that the subject picture element is a character or a diagram when the black areas are continuous right through the white base, while it is decided that the subject picture element is a part of a reticulation in other cases.

The flow-chart shown in FIG. 14 illustrates the process of reaching this decision. First, in step S30, it is determined whether the subject picture element is an edge. If no edge is detected, the flow advances to step S31 in which it is determined that the subject picture element is a part of a photographic picture, whereupon the output from the dither circuit 105 is selected. On the other hand, when an edge is detected, the subject picture element is two-valued in step S32 If it is determined that the two-valued data has a succession (step S23), it is decided, in step S34, that the subject picture element is a character or a diagram, whereupon the output from the simple two-valuing circuit 4 is selected. If no succession in detected, it is determined, in step S35, that the subject picture element is a half-tone dot picture, whereupon the output from the moire suppression two-valuing circuit 106 is selected.

<Description of Picture Identification Circuit (FIGS. 15 to 18)>

Figure 15:
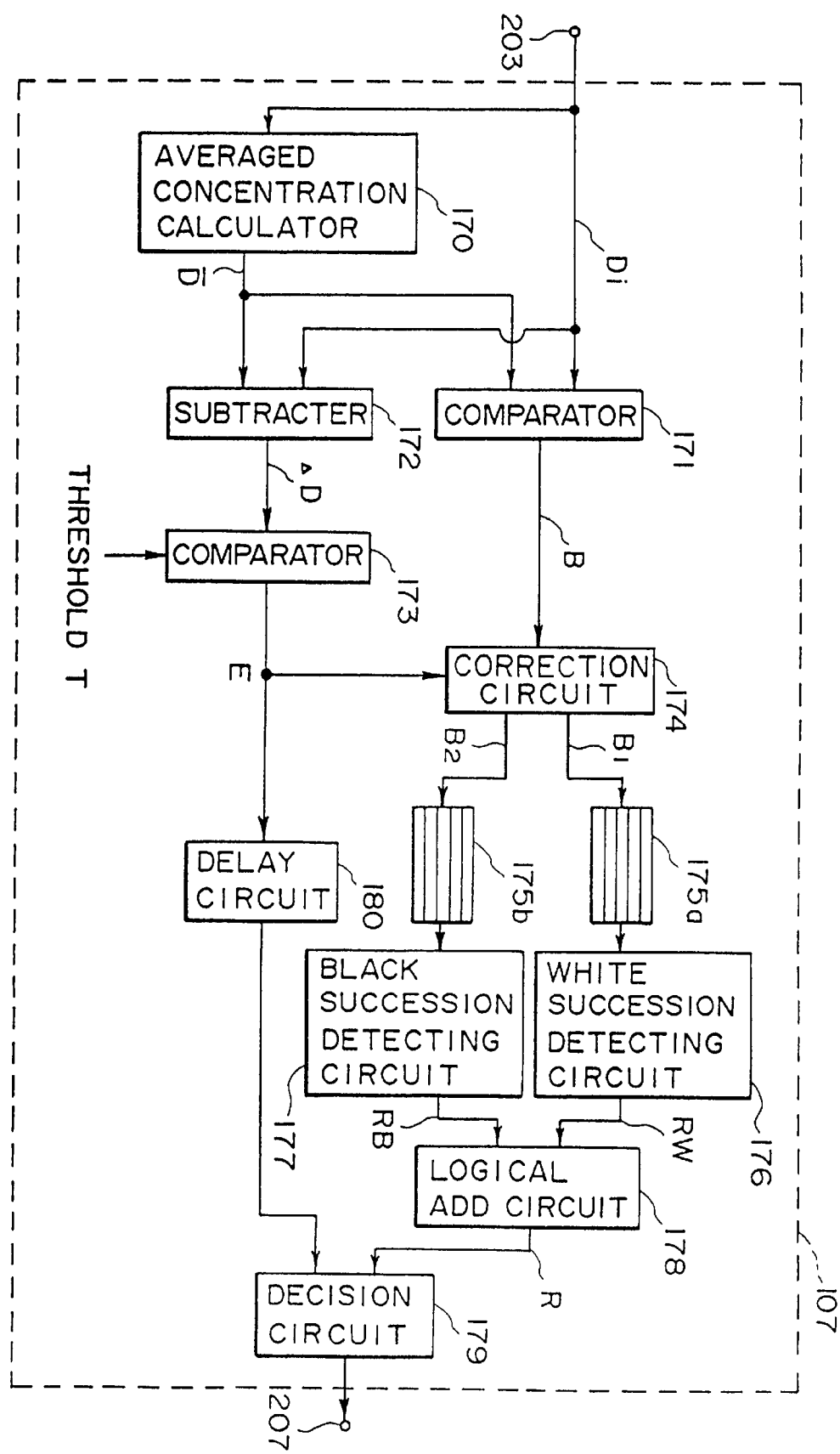
FIG. 15 is a block diagram of an image discrimination circuit in the third embodiment.

The specific structure of the picture identification circuit 107 for performing the above-described treatment is shown in FIG. 15, and an outline of this treatment will now be described.

The circuit shown in FIG. 15 is a circuit resulting from modification of the circuit shown in FIG. 5, Data 203 output by a tone correction circuit 103 is first input to an averaged concentration calculator 170 (equipped with buffers of three lines) in which the averaged concentration D of the eight picture elements (a block of 3×3 picture elements) surrounding the subject picture element is calculated. This is the difference between this embodiment and the averaging process illustrated in FIG. 5. The thus-calculated averaged concentration is output to each input terminal of a comparator 171 and a subtracter 172. The comparator 171 compares the calculated averaged concentration D with the concentration Di of the subject picture element. When it is decided that Di>D, the comparator 171 outputs, as the output B thereof, "1", while when it is decided that this is not the case ($Di \leq D$), it outputs "0".

The subtracter 172 calculates the difference between the averaged concentration D and the concentration Di of the subject picture element. In this case, the degree $\Delta D$ of difference $\Delta D$, that is, $\Delta D = |D - Di|$ is calculated (wherein $| \ldots |$ is an absolute value). The comparator 171 and the subtracter 172 are each provided with a latch for retaining the concentration of the subject picture element, whereby the averaged concentration D output by the averaged concentration calculator 170 can be used in the calculation in a synchronized manner.

The output $\Delta D$ from the subtracter 172 is output to a comparator 173 wherein the output $\Delta D$ is compared with a predetermined threshold T. The result (signal E) of this comparison is output to a decision circuit 179 through a correction circuit 174 and a delay circuit 180 which will be described later. When ΔD>T, a signal of a level "1" is output as a signal E, while when ΔD≦T, a signal of a level "0" is output as the signal E.

The correction circuit 174 (see FIG. 5) receives a signal B and the signal E, and then it outputs signals $B_1$ and $B_2$ to line-buffer groups 175a and 175b (for example, FIFO) covering five lines whereby the signals $B_1$ and $B_2$ are temporarily stored. Both these signals $B_1$ and $B_2$ become "0" when the signal E is "0". When the signal E is "1" and the signal B is "0", the signal $B_1$ becomes "1" and the signal $B_2$ becomes "0". Conversely, when the signal B is "1", the signal $B_1$ becomes "0" and the signal $B_2$ becomes "1".

The relationships of these signals is shown in Table 3.

TABLE 3

| E | B | $B_1$ | $B_2$ |
|---|---|---|---|
| 0 | 0 | 0 | 0 |
|   | 1 | 0 | 0 |
| 1 | 0 | 1 | 0 |
|   | 1 | 0 | 1 |

As shown in this table, when it is determined that there is no significant difference between the concentration Di of the subject picture element and that of the neighbouring picture elements (that is, when E=0, it is determined that there is no significant difference in concentration), both outputs $B_1$ and $B_2$ from the correction circuit 174 become signals of a "0" level, and are stored in corresponding line-buffer groups 75a and 75b.

When the concentration Di of the subject picture element is significantly lower than that of the neighboring picture elements, a 1-bit signal is stored in the corresponding line-buffer groups 175a and 175b, the 1-bit signals being so constituted that the output $B_1$ is set to "1" and the output $B_2$ is set to "0". On the other hand, when the concentration Di of the subject picture element is significantly higher than the neighboring picture elements, a 1-bit signal is stored in the corresponding line-buffer groups 175a and 175b, the 1-bit signal being so constituted that the output $B_1$ is set to "0" and the output $B_2$ is set to "1".

Figure 17B:
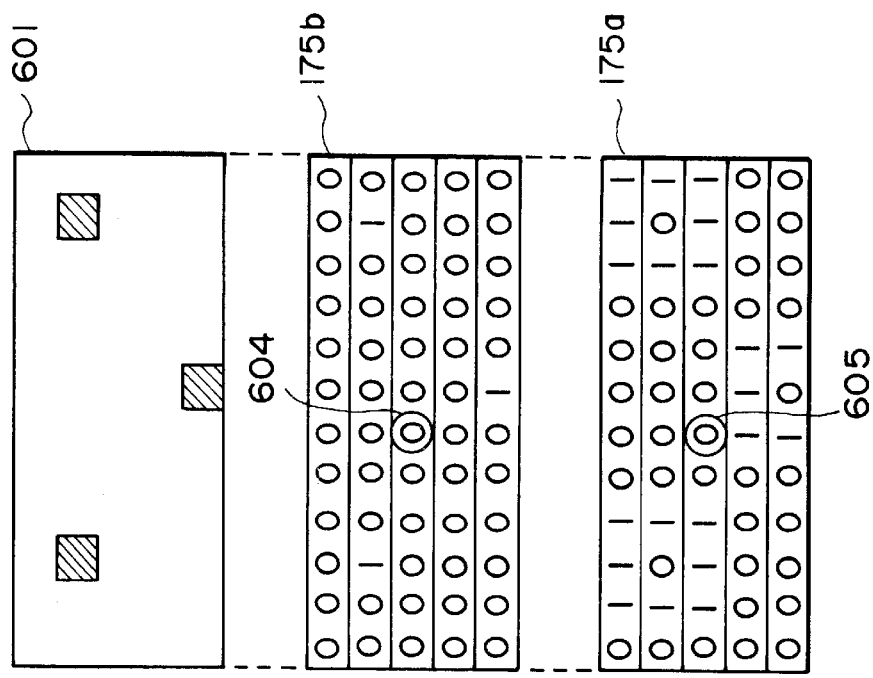
FIGS. 17A and 17B are diagrams illustrating the relationships between information stored in a buffer group and an input image in FIG. 15.

Next, a specific state of storing data in the line-buffer groups 175a and 175b with respect to the input image will be described with reference to FIGS. 17A and 17B.

Figure 17A:
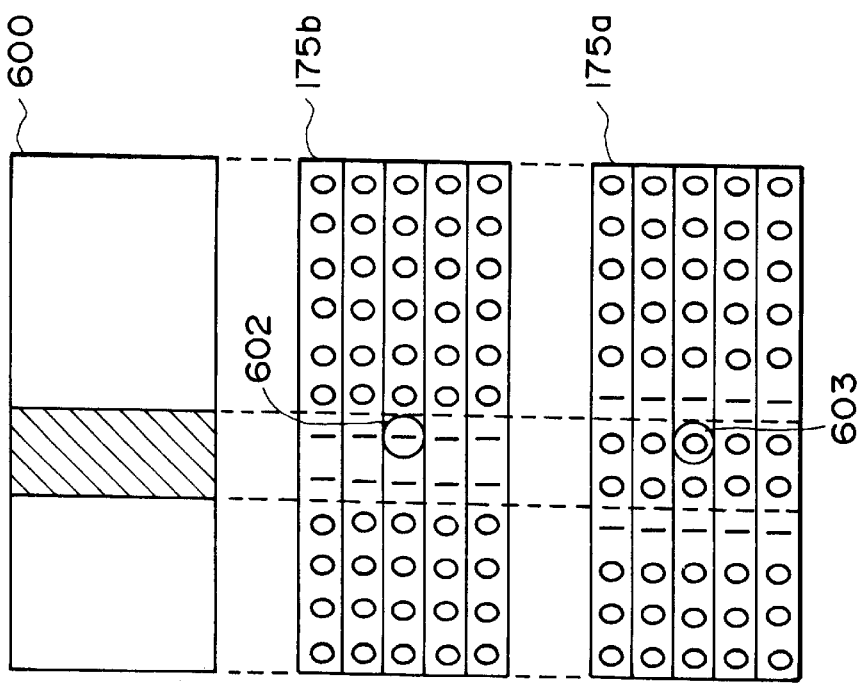

In FIG. 17A, when, for example, an input picture 600 (which shows a part of a character or a diagram) is input by the procedure described above, the data illustrated in this figure is stored in the line-buffer groups 175a and 175b. When an input picture 601 (which is equivalent to a half-tone dot picture) is input, the data shown in FIG. 17B is stored in the corresponding line-buffer groups 175a and 175b. That is, in the line-buffer group 175a, black edge portions are located in the white base, the black edge portions being located in the form of a "1". In the line-buffer group 175b, white edge portions are located in the black base, the white edge portions being located in the form of a "1". In these figures, reference numerals 602 to 605 each represent a location of the subject picture element.

As described above, when the outputs $B_1$ and $B_2$ covering five lines are located in the corresponding line-buffer groups 175a and 175b, a white succession detecting circuit 176 and a black succession detecting circuit 177 respectively determine whether the black or white edges of the subject picture element are successive.

Since the structure of the white succession detection circuit 176 is the same as that of the black succession detection circuit 177, the black succession detection circuit 177 alone will now be described.

Figure 18A:
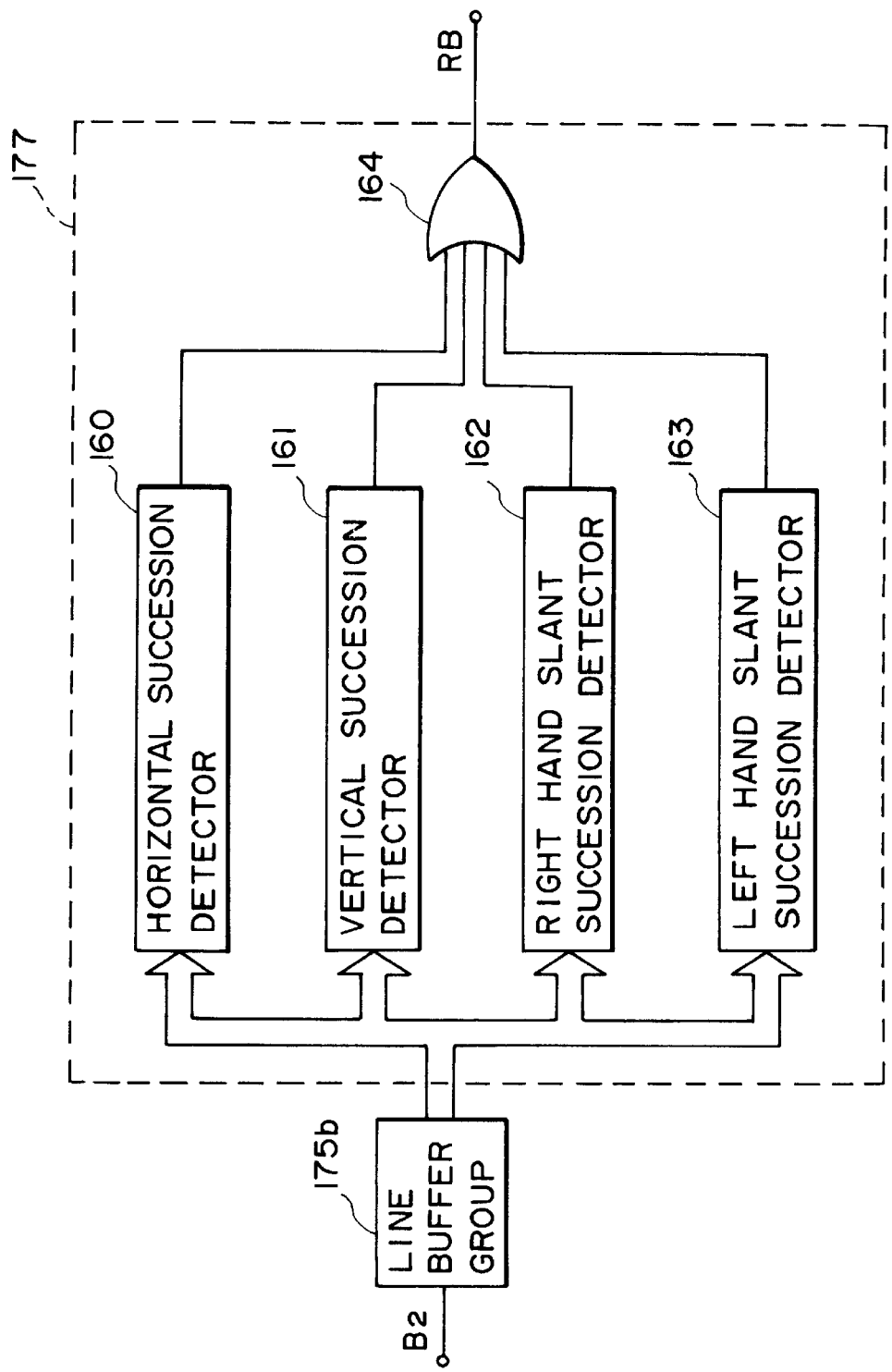
FIG. 18A is a block diagram of a white/black picture element succession detecting circuit.

The black succession detection circuit 177 comprises, as shown in FIG. 18A, detectors 160 and 163 for detecting successions in each direction. When a detector detects a succession in the relevant direction, its output becomes "1". The result of the detection is output to a logical add circuit 164 in which the result is output as an RB signal.

Figure 18B:
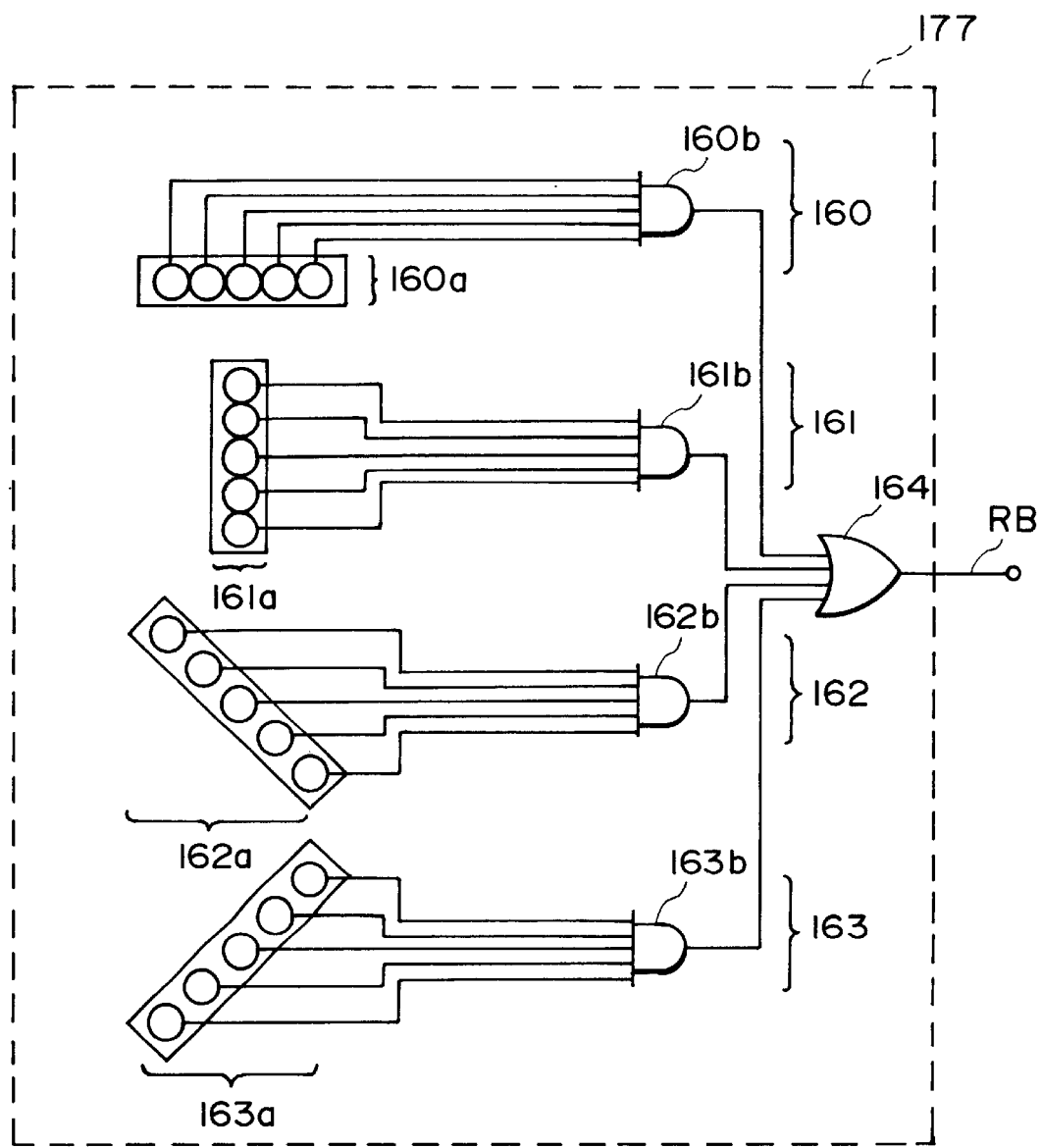
FIG. 18B is a diagram illustrating a specific configuration of the white/black picture element succession detecting circuit.

Specifically, the black succession detection circuit 177 comprises, as shown in FIG. 18B, a horizontal succession detector 160 which consists of a latch 160a and an AND gate 160b.

Therefore, the RB signal becomes "1" only when "1" is successively retained in either one of the latched in the horizontal, vertical, left hand or right hand directions, including the result (signal $B_2$) of detecting the edges of subject picture elements. In the other words, if each latch 160a to 163a includes a "0", the RB signal becomes "0".

Referring back to FIG. 15, outputs RW and RB from the corresponding white succession detection circuit 176 and the black succession detection circuit 177 are logic-added by the logical add circuit 178 thereby to supply an output R to a decision circuit 179. The output E from the comparator 173 is output to another input terminal of the decision circuit 179 through a delay circuit 180 in synchronization with the detection of the succession of subject picture elements.

The decision circuit 179 forms an output signal 207 shown in Table 4, the output signal 207 being formed from the signal R and the signal E.

As can be clearly seen from the above description, the case of E being 0 corresponds to a state in which contrast is relatively weak, the case of E being 1 corresponds to a state in which contrast is relatively strong, the case of R being 1 corresponds to a state in which there is a succession, and the case of R being 0 corresponds to a state in which there is no succession.

TABLE 4

| E | R | Output H |
|---|---|---|
| 0 | 0 | 0 |
|   | 1 | 0 |
| 1 | 0 | 1 |
|   | 1 | 2 |

Therefore, the switch 108 shown in FIG. 12 selects the simple two-valuing circuit 104 when the output signal H from the decision circuit 179 is "1", thereby deciding the character region. The switch 108 selects the dither circuit 105 when the output signal H is "0", thereby it decides that it is a half-tone picture, and it selects a moire two-valuing circuit 106 when the output signal H is "2", thereby deciding that it is a half-tone dot picture. Thus a suitable treatment system can be selected to accord with the types of input pictures. Consequently, a good picture can be formed.

As an alternative to the output from the character detection circuit 18 shown in FIG. 1 or the output from the character detection circuit 118 shown in FIG. 8, the output signal H obtained from the picture identification circuit 107 may be input to the AND circuit 19 or the UCR amount decision circuit 119. In this way, the state of the character region can be detected even more precisely.

In the case where the output signal H is employed as an alternative to the output from the character detection circuit 18, a circuit may be provided in such a manner that when H is "1", 100%—UCR is conducted, while in the other cases, that is, where H is "0" or "2", 100%—UCR is not conducted.

In the case where the output signal H is used as an alternative to the output from the character detection circuit 118, 100%—UCR may be conducted when "H" is "1", while, for example, no 100%—UCR is conducted when H is either "0" or "2".

Although in the picture identification circuit 107 in the embodiments described above it is determined that there are edges when the difference in the density between the subject picture element and the neighboring picture elements exceeds a certain degree, this invention is not limited to this embodiment. Another type of circuit, for example, a circuit formed by the blocks 50 to 55 and the correction circuit 33*a* shown in FIG. 5 may, of course, be used too.

As described above, according to the decision system conducted in accordance with the embodiments, if a picture is input in which half-tone, characters, diagrams and half-tone dots are disposed in a mixed manner, each picture can be distinguished.

Furthermore, in the color image processing apparatus according to the embodiment, since high UCR % is applied to the black character region, black characters and other half-tone color pictures can be reproduced with high quality resolution.

As described above, when the undercolor treatment is applied to color pictures, in a method in which a stronger undercolor treatment is applied to the edge portions of a color picture, that is, when a high UCR % is employed, the picture becomes too hard because the half-tone color picture formed by half-tone dots is subjected to an excessive high UCR %. However, according to the system shown in the embodiment, since the half-tone dots and the characters are distinguished, the above phenomenon can be prevented, whereby a high-quality picture can be obtained.

Furthermore, although the quantity of ink is controlled and the UCR % is changed for the purpose of controlling the undercolor treatment in these embodiments, this invention is not limited to cases in which the above two processes are conducted. Either one may, of course, be conducted alone.

Furthermore, although in these embodiments the color dissolving treatment and the undercolor treatment are conducted in an electronic manner, these treatments are not limited to those conducted in an electronic manner, and they may of course conducted in an optical manner, similar to the case of a treatment conducted by a process machine.

What is claimed is:

1. A color image processing apparatus comprising:
   (a) edge detecting means for detecting, in a color image, a picture element of said image that defines an edge of the image;
   (b) discriminating means for discriminating a consecutive alignment of picture elements, each of which defines the edge detected by said edge detecting means;
   (c) color processing means for effecting color processing of said color image; and
   (d) means for controlling the state of color processing by said color processing means in accordance with the discrimination by said discriminating means.

2. A color image processing apparatus according to claim 1, further comprising color separating means for separating said color image into a plurality of color components.

3. A color image processing apparatus according to claim 2, wherein said discriminating means extracts a prescribed color component out of a plurality of color components separated by said color separating means so as to discriminate a character portion of said color image.

4. A color image processing apparatus according to claim 2, wherein said color processing means includes detecting means for detecting neutral color data out of said plurality of color components separated by said color separating means and undercolor processing means for processing said color image in correspondence with said neutral color data detected by said detecting means.

5. A color image processing apparatus according to claim 4, wherein said undercolor processing means subtracts said neutral color data from said plurality of color components separated by said color separating means.

6. A color image processing apparatus according to claim 5, wherein said undercolor processing means subtracts a value obtained by multiplying said neutral color data by a prescribed coefficient from said multiplicity of color components separated by said color separating means.

7. A color image processing apparatus according to claim 6, wherein said controlling means controls the state of color processing by said color processing means by controlling said coefficient.

8. A color image processing apparatus according to claim 1, further comprising means for converting incident radiation corresponding to a color image into an electrical color image signal, wherein said discriminating means discriminates a character portion by discriminating said color image signal.

9. A color image processing apparatus according to claim 1, further comprising reproducing means for reproducing a color image subjected to color processing by said color processing means as a visible image.

10. A color image processing apparatus according to claim 9, wherein said reproducing means reproduces said color image on a recording medium as said visible image.

11. A color image processing apparatus comprising:
    (a) edge detecting means for detecting, in a color image, a picture element of said image that defines an edge of the image;
    (b) discriminating means for discriminating consecutive alignment of picture elements, each of which defines the edge detected by said edge detecting means;
    (c) undercolor processing means for effecting undercolor processing of said color image; and
    (d) means for controlling the state of undercolor processing by said undercolor processing means in accordance with the discrimination by said discriminating means.

12. A color image processing apparatus according to claim 11, further comprising color separating means for separating said color image into a plurality of color components.

13. A color image processing apparatus according to claim 12, wherein said undercolor processing means includes means for detecting neutral color data out of said plurality of color components separated by said color separating means, wherein said undercolor processing means effects undercolor processing of said color image in accordance with said neutral color data.

14. A color image processing apparatus according to claim 13, wherein said undercolor processing means subtracts said neutral color data from said plurality of color components separated by said color separating means.

15. A color image processing apparatus according to claim 13, wherein said undercolor processing means subtracts a value obtained by multiplying said neutral color data by a prescribed coefficient from said multiplicity of color components separated by said color separating means.

16. A color image processing apparatus according to claim 15, wherein said controlling means controls the state of color processing by said color processing means by controlling said coefficient.

17. A color image processing apparatus according to claim 11, further comprising means for converting incident radiation corresponding to a color image into an electrical color image signal, wherein said discriminating means discriminates a character portion by discriminating said color image signal.

18. A color image processing apparatus according to claim 11, further comprising reproducing means for reproducing a color image subjected to color processing by said color processing means as a visible image.

19. A color image processing apparatus comprising:
(a) edge detecting means for detecting, in a color image, a picture element of said image that defines an edge of the image;
(b) discriminating means for discriminating a consecutive alignment of picture elements, each of which defines the edge detected by said edge detecting means;
(c) black portion extracting means for extracting a black portion of said color image; and
(d) undercolor removal amount determining means for determining an amount of undercolor removal in accordance with said black portion extracting means and said discriminating means.

20. A color image processing apparatus according to claim 19, wherein said undercolor removal amount determining means determines said amount of undercolor removal only with respect to a character portion in accordance with a black level of said extracted black portion.

21. A color image processing apparatus according to claim 19, further comprising color separating means for separating said color image into a plurality of color components.

22. A color image processing apparatus according to claim 21, further comprising color processing means including detecting means for detecting neutral color data out of said plurality of color components separated by said color separating means and undercolor processing means for processing said color image in correspondence with said neutral color data detected by said detecting means.

23. A color image processing apparatus according to claim 21, further comprising means for converting incident radiation corresponding to a color image into an electrical color image signal, wherein said discriminating means discriminates a character portion by discriminating said color image signal.

24. A color image processing apparatus according to claim 22, further comprising reproducing means for reproducing a color image subjected to color processing by said color processing means as a visible image.

25. A color image processing apparatus according to claim 24, wherein said reproducing means reproduces said color image on a recording medium as said visible image.

26. A color image processing method comprising the steps of:
(a) detecting, in a color image, a picture element of said image that defines an edge of the image;
(b) discriminating a consecutive alignment of picture elements, each of which defines the edge detected in said edge detecting step;
(c) effecting color processing of the color image with a color processor; and
(d) controlling the state of color processing in said color processing step in accordance with the discrimination in said discriminating step.

27. A color image processing method according to claim 26, further comprising the step of separating the color image into a plurality of color components.

28. A color image processing method according to claim 27, wherein in said discriminating step a prescribed color component is extracted out of a plurality of color components separated in said color separating step so as to discriminate a character portion of the color image.

29. A color image processing method according to claim 27, wherein in said color processing step neutral color data is detected from the plurality of color components separated in said color separating step and the color image is undercolor processed in correspondence with the neutral color data detected in said detecting step.

30. A color image processing method according to claim 29, wherein during undercolor processing the neutral color data is subtracted from the plurality of color components separated in said color separating step.

31. A color image processing method according to claim 30, wherein during undercolor processing a value obtained by multiplying the neutral color data by a prescribed coefficient is subtracted from the multiplicity of color components separated in said color separating step.

32. A color image processing method according to claim 31, wherein in said controlling step the state of color processing in said color processing step is controlled by controlling the coefficient.

33. A color image processing method according to claim 26, wherein in said discriminating step it is ascertained that picture elements of a prescribed density level in the color image are formed continuously in a prescribed direction.

34. A color image processing method according to claim 26, further comprising the step of converting incident radiation corresponding to a color image into an electrical. color image signal, wherein in said discriminating step a character portion is discriminated by discriminating the color image signal.

35. A color image processing method according to claim 26, further comprising the step of reproducing a color image subjected to color processing in said color processing step as a visible image.

36. A color image processing method according to claim 35, wherein in said reproducing step the color image is reproduced on a recording medium as the visible image.

37. A color image processing apparatus comprising:
(a) edge detecting means for detecting, in a color image, a portion of said image that defines an edge of the image;
(b) discriminating means for discriminating a consecutive alignment of portions, each of which defines the edge that is detected by said edge detecting means;
(c) color processing means for effecting color processing of said color image; and
(d) means for controlling the state of color processing by said color processing means in accordance with the discrimination by said discriminating means.

38. A color image processing apparatus according to claim 37, further comprising color separating means for separating said color image into a plurality of color components.

39. A color image processing apparatus according to claim 38, wherein said color processing means includes detecting means for detecting neutral color data out of said plurality of color components separated by said color separating means and undercolor processing means for processing said color image in correspondence with said neutral color data detected by said detecting means.

40. A color image processing apparatus according to claim 38, further comprising means for converting incident radiation corresponding to a color image into an electrical color image signal, wherein said discriminating means discriminates a character portion by discriminating said color image signal.

41. A color image processing apparatus according to claim 38, further comprising reproducing means for reproducing a color image subjected to color processing by said color processing means as a visible image.

42. A color image processing apparatus according to claim 41, wherein said reproducing means reproduces said color image on a recording medium as said visible image.

43. A color image processing apparatus comprising:
(a) edge detecting means for detecting, in a color image, a portion of said image that defines an edge of the image;
(b) discriminating means for discriminating a consecutive alignment of portions, each of which defines the edge that is detected by said edge detecting means;
(c) black portion extracting means for extracting a black portion of said color image; and
(d) undercolor removal amount determining means for determining an amount of undercolor removal in accordance with said black portion extracting means and said discriminating means.

44. A color image processing apparatus according to claim 43, further comprising color separating means for separating said color image into a plurality of color components.

45. A color image processing apparatus according to claim 44, further comprising color processing means including detecting means for detecting neutral color data out of said plurality of color components separated by said color separating means and undercolor processing means for processing said color image in correspondence with said neutral color data detected by said detecting means.

46. A color image processing apparatus according to claim 44, further comprising means for converting incident radiation corresponding to a color image into an electrical color image signal, wherein said discriminating means discriminates a character portion by discriminating said color image signal.

47. A color image processing apparatus according to claim 45, further comprising reproducing means for reproducing a color image subjected to color processing by said color processing means as a visible image.

48. A color image processing apparatus according to claim 47, wherein said reproducing means reproduces said color image on a recording medium as said visible image.

49. A color image processing method comprising the steps of:
(a) detecting, in a color image, a portion of said image that defines an edge of the image;
(b) discriminating a consecutive alignment of portions, each of which defines the edge that is detected in said edge detecting step;
(c) effecting color processing of the color image with a color processor; and
(d) controlling the state of color processing in said color processing step in accordance with the discrimination in said discriminating step.

50. A color image processing method according to claim 49, further comprising the step of separating said color image into a plurality of color components.

51. A color image processing method according to claim 50, further comprising the step of detecting neutral color data out of said plurality of color components separated in said color image separating step and processing said color image in correspondence with said neutral color data detected by said neutral color data detecting step.

52. A color image processing method according to claim 50, further comprising the step of converting incident radiation corresponding to a color image into an electrical color image signal, wherein said discriminating step discriminates a character portion by discriminating said color image signal.

53. A color image processing method according to claim 50, further comprising the step of reproducing a color image subjected to color processing by said color processing step as a visible image.

54. A color image processing method according to claim 53, wherein said reproducing step reproduces said color image on a recording medium as said visible image.

55. An image processing apparatus comprising:
(a) edge detecting means for detecting, in an image, a portion of said image that defines an edge of the image;
(b) discriminating means for discriminating a consecutive alignment of portions, each of which defines the edge that is detected by said edge detecting means;
(c) processing means for effecting half tone processing of said image; and
(d) means for controlling the state of half tone processing by said processing means in accordance with the discrimination by said discriminating means.

56. An image processing apparatus according to claim 55, wherein said processing means effects dither half tone processing of said image.

57. An image processing apparatus according to claim 55, further comprising means for converting incident radiation corresponding to an image into an electrical image signal, wherein said discriminating means discriminates a character portion by discriminating said image signal.

58. An image processing apparatus according to claim 55, further comprising reproducing means for reproducing an image subjected to half tone processing by said processing means as a visible image.

59. An image processing apparatus according to claim 58, wherein said reproducing means reproduces said image on a recording medium as said visible image.

60. An image processing method comprising the steps of:
(a) detecting, in an image, a portion of said image that defines an edge of the image;
(b) discriminating a consecutive alignment of portions, each of which defines the edge that is detected in said edge detecting step;
(c) effecting half tone processing of the image with an image processor; and
(d) controlling the state of half tone processing in said color processing step in accordance with the discrimination in said discriminating step.

61. An image processing method according to claim 60, wherein said effecting step effects dither half tone processing of said image.

62. An image processing method according to claim 60, further comprising the step of converting incident radiation corresponding to an image into an electrical image signal, wherein said discriminating step discriminates a character portion by discriminating said image signal.

63. An image processing method according to claim 60, further comprising the step of reproducing an image subjected to half tone processing in said effecting step as a visible image.

64. An image processing method according to claim 63, wherein said reproducing step reproduces said image on a recording medium as said visible image.

65. A color image processing apparatus comprising:
(a) image input means for inputting information corresponding to a color image;
(b) edge detecting means for detecting, in the color image, a portion of the color image that defines an edge of the color image;
(c) discriminating means for discriminating a consecutive alignment of portions that are detected by said edge detecting means;
(d) color processing means for effecting color processing of the color image; and
(e) means for controlling the state of color processing by said color processing means in accordance with the discrimination by said discriminating means.

* * * * *

UNITED STATES PATENT AND TRADEMARK OFFICE
CERTIFICATE OF CORRECTION

PATENT NO. : 6,415,052 B1
DATED : July 2, 2002
INVENTOR(S) : Hidefumi Ohsawa

It is certified that error appears in the above-identified patent and that said Letters Patent is hereby corrected as shown below:

Title page,
FOREIGN PATENT DOCUMENTS, "5648869" should read -- 56-48869 --; and "6113262" should read -- 61-13262 --.

Column 3,
Line 2, close up left margin.
Line 3, close up right margin.
Line 48, "($_2$," should read -- ($Y_2$, --.

Column 4,
Line 28, "threshold" should read -- threshold and thus positively discriminated" --
Line 29, "smaller" should read -- smaller and thus negatively discriminated. --.
Line 41, "of" should read -- of positively discriminated --.

Column 5,
Line 31, "afore-mentioned" should read -- aforementioned --.

Column 8,
Line 24, "S32" should read -- S32. --.
Line 39, "FIG. 5," should read -- FIG. 5. --.

Signed and Sealed this

Tenth Day of December, 2002

JAMES E. ROGAN
*Director of the United States Patent and Trademark Office*